United States Patent
Bonne et al.

(10) Patent No.: US 6,234,016 B1
(45) Date of Patent: May 22, 2001

(54) TIME LAG APPROACH FOR MEASURING FLUID VELOCITY

(75) Inventors: Ulrich Bonne, Hopkins; David Kubisiak, Chanhassen; Robert J. Matthys, St. Anthony; Spencer B. Schuldt, Bloomington, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/002,157

(22) Filed: Dec. 31, 1997

(51) Int. Cl.[7] ................................................. G01F 1/68

(52) U.S. Cl. ................................................... 73/204.26

(58) Field of Search ........................... 73/204.26, 204.25, 73/204.15

(56) References Cited

U.S. PATENT DOCUMENTS

| | | | |
|---|---|---|---|
| 3,015,232 | 1/1962 | Schnoll | 73/204 |
| 3,335,606 | 8/1967 | Scarpa | 73/204 |
| 4,279,147 | 7/1981 | Djorup | 73/189 |
| 4,576,050 | 3/1986 | Lambert | 73/861.05 |
| 4,682,503 | 7/1987 | Higashi et al. | 73/755 |

(List continued on next page.)

FOREIGN PATENT DOCUMENTS

| | | |
|---|---|---|
| 3234146A1 | 9/1982 | (DE) . |
| 4222458A1 | 7/1992 | (DE) . |
| 0232719A1 | 1/1986 | (EP) . |
| 0348245A2 | 6/1988 | (EP) . |
| 57206830 | 6/1981 | (JP) . |
| 0420825 | 3/1994 | (WO) . |

OTHER PUBLICATIONS

Bonne et al., "Burstproof, Thermal Pressure Sensor for Gases", Solid State Sensor and Actuator Workshop, 2 pages.
Lambert et al., "An air flow sensor based on interface thermal wave propagation", *J. Appl. Phys.*, 59(1), Jan. 1986, 3 pages.
Bonne et al., "Natural Gas Flow and Property Sensor", *GRI Engine Technology Advisory Committee Meeting*, May 1996, 5 pages.
Healy et al., "The Theory of the Transient Hot–Wire Method for Measuring Thermal Conductivity", *Physics*, 82C (1976) pp. 392–408.
Protodyanakonow et al., "The Use of Probes in Investigating Two–Phase Flow", *Fluid Mech., Soviet Res.*, 12, No. 3, (May–Jun. 1983), pp. 98–157.
Carslaw et al., "Conduction of Heat in Solids", $2^{nd}$ Edition, Clarendon Press, Oxford, UK (1959), 7 pages.
Mylroi, "Cross–Correlation Flow Measurement Systems", *G.B.*, 12, No. 6–7, 1977, 4 pages.
Kubisiak et al, "Microamemometer–Based Gas Flow Sensing", *IGT Symposium of Natural Gas Quality Measurement*, Jul. 1990, 18 pages.

*Primary Examiner*—Benjamin R. Fuller
*Assistant Examiner*—Jewel V. Thompson
(74) *Attorney, Agent, or Firm*—John G. Shudy, Jr.

(57) ABSTRACT

A method and apparatus for measuring the velocity of a fluid relatively independently of the physical properties of the fluid. This is preferably accomplished by spacing two sensor elements at different distances from a heater element. The present invention also contemplates minimizing the effects of the non-zero heater time lag and/or the non-zero sensor time lag for increased accuracy. This is preferably accomplished by either measuring the time lags and subtracting the values thereof from an uncorrected transit time measurement, forcing the sensor elements to track the thermal disturbance in the fluid thereby minimizing the effects of the sensor time lags, or measuring the transit time using sensors that have substantially zero thermal mass.

37 Claims, 15 Drawing Sheets

U.S. PATENT DOCUMENTS

| | | | |
|---|---|---|---|
| 4,713,970 | 12/1987 | Lambert | 73/861.05 |
| 4,944,035 | 7/1990 | Aagardl et al. | 364/556 |
| 4,961,348 | 10/1990 | Bonne | 73/861.02 |
| 5,150,611 | 9/1992 | Kleinhans | 73/204.14 |
| 5,184,509 | 2/1993 | Kienzle et al. | 73/204.14 |
| 5,193,388 | 3/1993 | Kleinhans | 73/204.14 |
| 5,237,523 | 8/1993 | Bonne et al. | 364/571.03 |
| 5,243,858 * | 9/1993 | Erskine et al. | 73/204.26 |
| 5,247,156 | 9/1993 | Favre | 219/209 |
| 5,303,167 | 4/1994 | Bonne | 364/556 |
| 6,019,505 * | 2/2000 | Bonne et al. | 374/40 |

* cited by examiner

TIME LAG APPROACH FOR MEASURING FLUID VELOCITY

CROSS REFERENCE TO CO-PENDING APPLICATIONS

The present application is related to U.S. patent application Ser. No. 09/002,156, filed Dec. 31, 1997, entitled "METHOD AND APPARATUS FOR MEASURING SELECTED PROPERTIES OF A FLUID OF INTEREST USING A SINGLE HEATER ELEMENT", U.S. patent application Ser. No. 09/001,530, filed Dec. 31, 1997, entitled "TIME LAG APPROACH FOR MEASURING THERMAL CONDUCTIVITY AND SPECIFIC HEAT", U.S. patent application Ser. No. 09/001,735, filed Dec. 31, 1997, entitled "SELF-OSCILLATING FLUID SENSOR", and U.S. patent application Ser. No. 09/001,453, filed Dec. 31, 1997, entitled "FLUID PROPERTY AND FLOW SENSING VIA A COMMON FREQUENCY GENERATOR AND FFT", which are all assigned to the assignee of the present invention and incorporated herein by reference.

BACKGROUND OF THE INVENTION

1. Field of the Invention

The present invention generally relates to the measurement of fluid properties and, more particularly, to the determination of the velocity of a fluid of interest.

2. Description of the Prior Art

A number of techniques have been devised to measure the velocity of a fluid within a lumen. One approach is the "time of flight" approach, which generally includes determining the time require for a thermal wave to flow from a source heater element to a destination sensor element. By knowing the distance between the heater and sensor, the velocity of the fluid can thus be calculated.

U.S. Pat. No. 4,576,050 to Lambert discloses one such "time of flight approach. Lambert suggests energizing a heater strip with an oscillating heater input signal to emit thermal waves in the fluid. The thermal waves propagate through the fluid at a rate that is dependent on the fluid velocity that flows perpendicular to the heater strip. A thermo-electric detector, spaced from one or both side of the heater, senses the thermal wave and provides a corresponding detector output signal. The velocity of the fluid can be determined, at least to first order, from the time differential between the heater input signal and the detector output signal.

A limitation of the Lambert approach is that the measured time or phase differential between the heater input signal and the detector output signal depends on a number of physical properties of the fluid, including, for example, temperature, pressure, thermal conductivity, and thermal diffusivity. To compensate for some of these parameters, Lambert suggests making a reference measurement with a second sensor that is exposed to still fluid or fluid having a velocity component that is perpendicular to the source of the second sensor. By comparing the output of the second sensor with that of the first sensor, Lambert suggests that a phase difference can be computed that is independent of at least some of the fluid properties listed above. As can be seen, the second sensor of Lambert is not used to measure the fluid velocity, but rather is used to compensate for selected physical properties of the fluid.

Another limitation of the Lambert approach is that several potential error sources in the phase differential measurement are neglected, thereby reducing the accuracy of the measurement. One such error source is the non-zero heater time lag that typically exists between the heater input signal and the elevated temperature response of the heater element (and thus the fluid). The heater time lag is typically dominated by the thermal conductivity, k, of the fluid of interest, at least for microbridge structures as contemplated by a preferred embodiment of the present invention.

Another error source is the non-zero sensor time lag that typically exists between the arrival of the temperature disturbance at the sensor element and the corresponding response of the sensor element. The temperature of the sensor element typically does not react instantaneously to a temperature change in the fluid, primarily due to the sensors non-zero thermal mass.

It would be desirable, therefore, to provide an method and apparatus whereby the fluid velocity can be determined relatively independently of the physical properties of the fluid. It would also be desirable to provide a flow sensor that accounts for the non-zero heater time lag and the non-zero sensor time lag for increased accuracy.

SUMMARY OF THE INVENTION

The present invention overcomes many of the disadvantages associated with the prior art by providing a method and apparatus whereby the fluid velocity can be determined relatively independently of the physical properties of the fluid, and minimizes the effects of the non-zero heater time lag and/or the non-zero sensor time lag for increased accuracy.

In a first embodiment of the present invention, a heater element and at least two spaced sensor elements are provided, whereby the sensor elements are spaced at different distances from the heater element. The heater and sensor elements are disposed in and closely coupled to a fluid medium (fluid or gas) of interest. A time-varying input signal is provided to the heater element, which heats the surrounding fluid. Of interest is the transit times for the temperature disturbance to travel from the heater element to selected sensor elements. Because the sensor elements are spaced at different distances from the heater element, and as more fully described below, the fluid velocity can be calculated from the measured transit time values relatively independently of the fluid properties.

To reduce the effects of the non-zero heater and sensor time lags on the desired transit times, a first embodiment of the present invention contemplates measuring the heater and sensor time lags during a calibration procedure. The heater and sensor time lags can be directly measured by providing a heater input signal to the heater element, and a sensor input signal to each of the sensor elements. By monitoring the transient temperature responses of the heater and sensor elements via heater and sensor output signals, respectively, the heater and sensor time lags can be determined. To obtain more accurate transit times for the temperature disturbance in the fluid, the heater time lag and/or the sensor time lags may be subtracted from the overall time lags measured between the heater input signal and each of the sensor output signals.

Another approach to reduce the effects of the non-zero heater and sensor time lags is to provide heat to the sensor elements via the corresponding sensor input signal during operation. The sensor input signals are preferably controlled to provide a frequency, phase and amplitude that produce a resulting temperature response in the corresponding sensor element that tracks the temperature disturbance in the fluid. When this condition is satisfied, substantially zero heat is transferred from the fluid to the sensor elements, and the effect of the sensor time lags are minimized.

The proper phase and amplitude of the sensor input signals can be determined during a calibration procedure. In one embodiment, the sensor elements are first subjected to a vacuum condition, and a sensor input signal is provided to each of the sensor elements. Because no fluid surrounds the sensor elements, substantially no heat is transferred from the sensor elements to the fluid. A sensor time lag between the sensor input signal and the resulting temperature response of each sensor element is measured and stored. A power/resistance ratio of each sensor element is also measured and stored.

The sensor elements are then subjected to a fluid of interest. During operation, the phase of each of the sensor input signals is adjusted so that the resulting sensor time lag equals the sensor time lag measured under vacuum conditions. Likewise, the amplitude of each of the sensor input signals is adjusted so that the resulting power/resistance ratio equals the power/resistance ratio measured under vacuum conditions. Under these conditions, the sensor time lags may be reduced or eliminated as a factor when determining the transit times of the temperature disturbance.

The effect of the heater lag time may be reduced or eliminated by beginning the time lag measurement when a heater output signal crosses a predetermined threshold, where the heater output signal is proportional to the resistance (temperature) of the heater element. Alternatively, the effect of the heater time lag may be reduced or eliminated by starting the time lag measurement when the heater input signal crosses a predetermined threshold, and then subtracting the heater time lag from the resulting overall time lag value.

Rather than measuring the temperature disturbance with a temperature sensitive resistor, it is contemplated that the velocity of the fluid may be determined by using optical sensors. In an illustrative embodiment, a time lag is determined between a first location and a second location for a transient elevated temperature condition in the fluid using a first and second optical sensors. The first optical sensor optically detects the transient elevated temperature condition at the first location, and the second optical sensor optical detects the transient elevated temperature condition at the second location. By knowing the distance between the first and second optical sensors, the fluid velocity may be determined. It is also contemplated that optical sensors may be used to measure the various lag times to determine the thermal conductivity, thermal diffusivity and specific heat of a fluid of interest.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention, then, is directed to a system that determines the fluid velocity relatively independently of the physical properties of the fluid, and minimizes the effects of the non-zero heater time lag and/or the non-zero sensor time lag for increased accuracy. The preferred embodiments of the present invention contemplate disposing a microscopic sized heating element in a sample of the fluid of interest. The microsensor system or "microbridge", as it will be referred to herein, though not limiting, is presently preferred for several reasons. The system is extremely fast-reacting, is very accurate, very sensitive because of its advantageous coupling to the fluid of interest and small and adaptable to a variety of configurations.

The microbridge semiconductor chip sensor contemplated, for example, in certain embodiments preferred for the invention may resemble the form of one or more of the microbridge systems illustrated in U.S. Pat. No. 4,478,076, U.S. Pat. No. 4,478,077, U.S. Pat. No. 4,501,144, U.S. Pat. No. 4,651,564, U.S. Pat. No.4,683,159, and U.S. Pat. No. 4,994,035, all of common assignee with the present invention.

Figure 1:
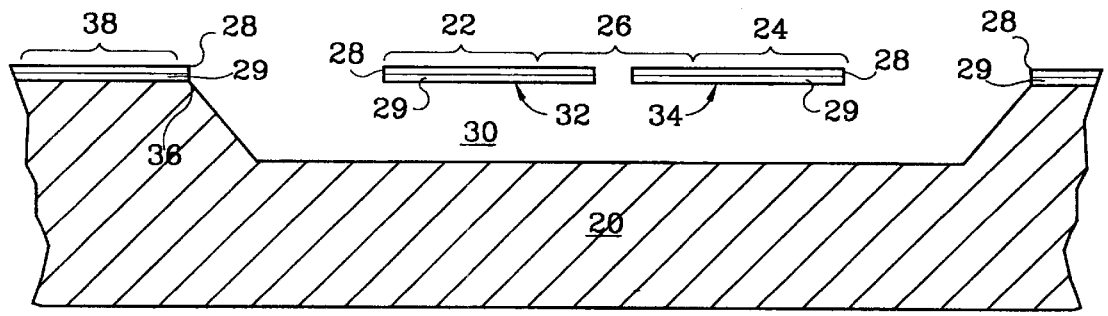
FIGS. 1, 2 and 3 are different views of a prior art embodiment of a microbridge flow sensor.
Figure 2:
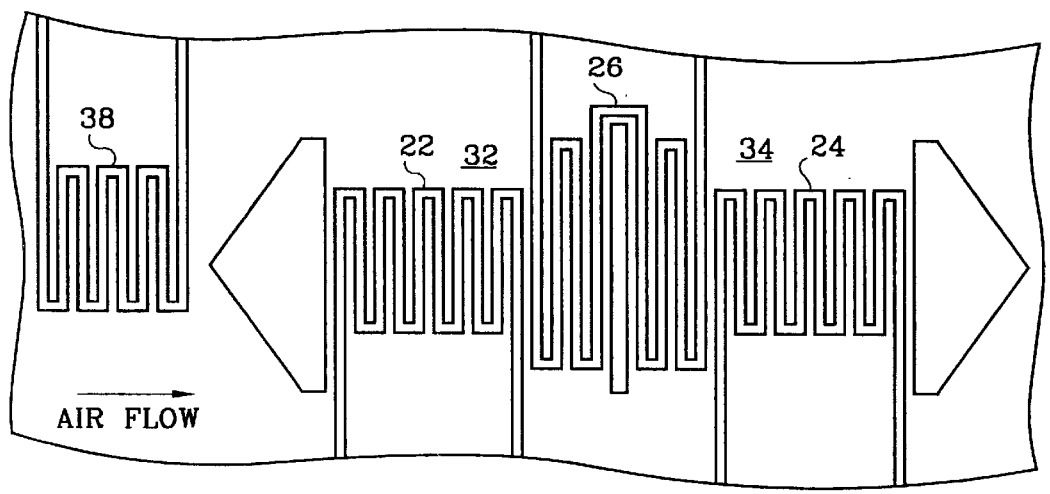
Figure 3:
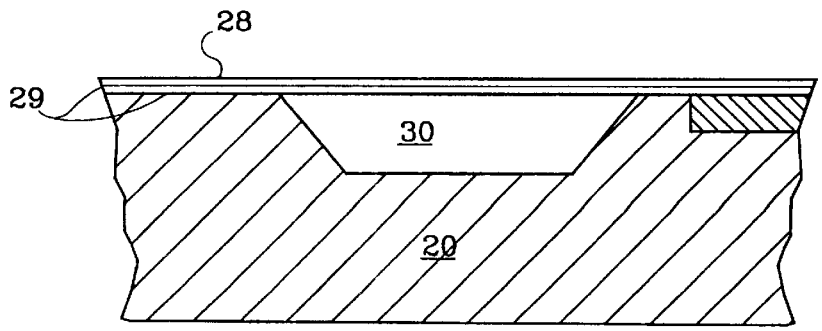

Such a system is exemplified by FIGS. 1–3 taken from U.S. Pat. No. 4,994,035 to Aagard et al. A discussion of that example will now be presented as it will be helpful in understanding the present invention. While the present discussion is believed sufficient, to the extent necessary, any additional material contained in the microbridge related patents cited is deemed to be incorporated herein by reference.

The prior art system of FIGS. 1–3 contemplates a pair of thin film temperature sensors 22 and 24, a thin film heater 26 and a support member 20 supporting the sensors and heater out of contact with the base substrate. Sensors 22 and 24 are disposed on opposite sides of heater 26. Support member 20 is a semiconductor, preferably silicon, chosen because of its adaptability to precision etching techniques and ease of electronic chip producibility. The embodiment includes two identical temperature sensing resistor grids 22 and 24 acting as the thin film heat sensors and a centrally located heater resistor grid 26 acting as the thin film heater.

Sensors 22 and 24 and heater 26 may be fabricated of any suitable, stable metal or alloy film. The metal used may be a nickel-iron alloy sometimes referred to as permalloy, with a composition of 80 percent nickel and 20 percent iron. The sensor and heater grids are encapsulated in a thin film of dielectric, typically comprising layers 28 and 29 and preferably silicon nitride, $Si_3N_4$ to form the film members.

In FIGS. 1 and 2, the sensor comprises two thin film members 32 and 34, with member 32 comprising sensor 22 and member 34 comprising sensor 24, each member comprising one-half of heater 26 and having a preferred dimension of 150 microns wide and 400 microns long.

The system further describes an accurately defined fluid space 30 that effectively surrounds elements 22, 24, 26, and is achieved by fabricating the structure on silicon surface 36. Thin film elements 22, 24 and 26 have thicknesses of approximately 0.08 to 0.12 micron with line widths on the order to 5 microns and spaces between lines on the order of 5 microns. The elements encapsulated in the silicon nitride film preferably have a total thickness of approximately 0.8 microns or less. The fluid space 30 may be fabricated by subsequently etching an accurately defined fluid space of about 100 microns deep into silicon body 20 beneath members 32 and 34.

Members 32 and 34 connect to top surface 36 of semiconductor body 20 at one or more edges of depression or fluid space 30. As illustrated in FIG. 3, members 32 and 34 may be bridged across depression 30; alternately, for example, members 32 and 34 could be cantilevered over depression 30.

In the system shown, heat flows from the heater to the sensor by means of both solid and fluid couplings therebetween. Of note is the fact that silicon nitride ($Si_3N_4$), besides being a good electrical insulator, is also an effective solid thermal insulator. Because the connecting silicon nitride film within members 32 and 34 is a good insulator, heat transmission through the solid does not dominate the propagation of heat from heater 26. This further enhances the relative amount of the heat conducted to sensing resistors 22 and 24 from heater resistor 26 by flow through the surrounding fluid rather than through the supporting nitride film. Moreover, the supporting silicon nitride film has a low enough thermal conductivity that sensing resistor grids 22 and 24 can be located immediately adjacent or juxtaposed to heating resistor grid 26. Thus, sensing resistor grids 22 and 24 are in effect suspended rigidly in the fluid space proximate heater resistor 26 and act as thermal probes to measure the temperature of the air near and in the plane of heater resistor grid 26.

Figure 4:
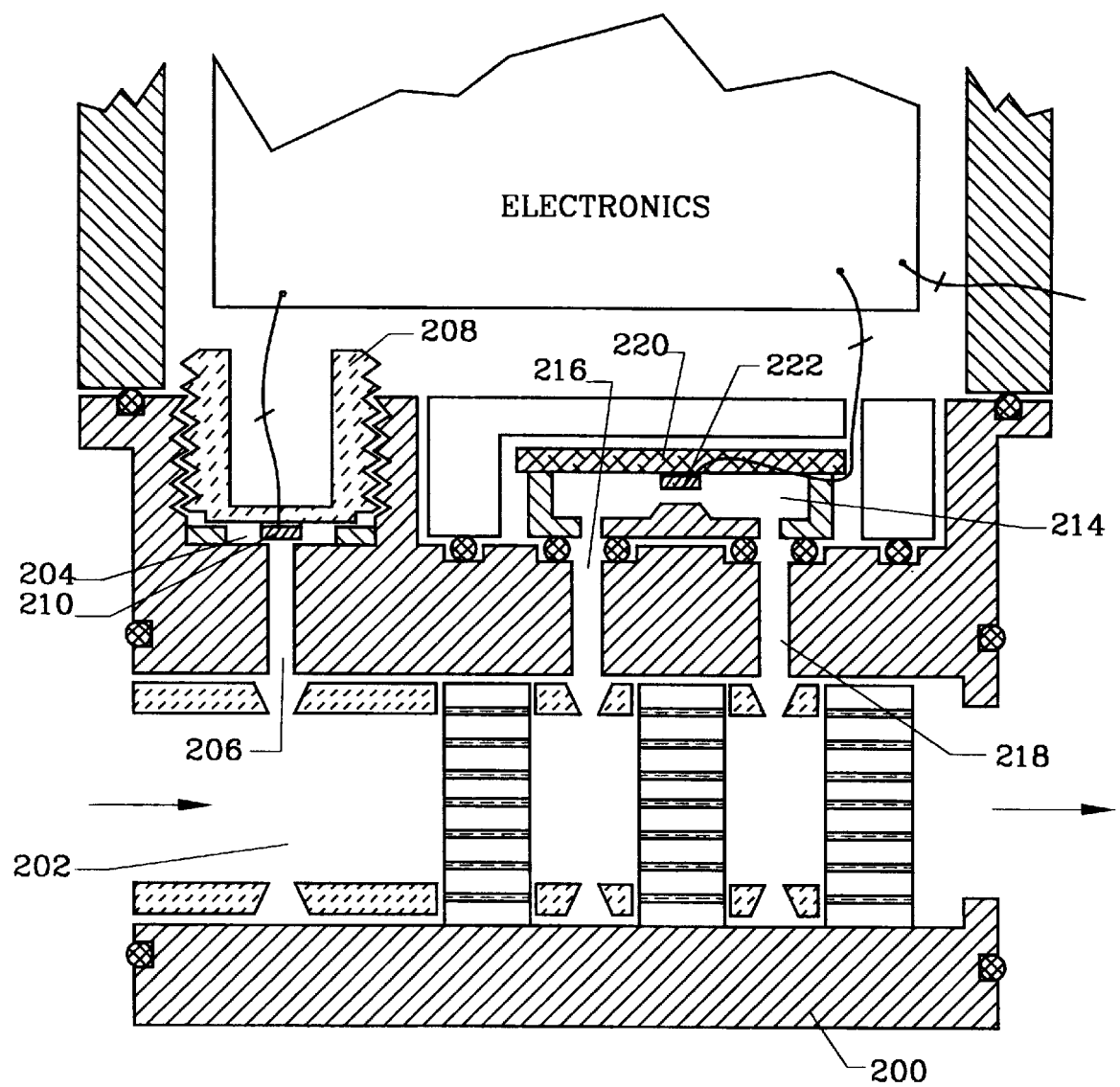
FIG. 4 is a partial cut-away view of a microbridge sensor system.

FIG. 4 is partial cut-away view of a microbridge sensor system placed in line with a flow pipe. A main flow channel 200 having a central bore 202 is connected to the pipe that carries a fluid of interest. A first chamber 204 is in fluid communication with the central bore 202 of the flange 200 via a single lumen 206. A header 208 having a first microbridge sensor 210 mounted thereto is inserted into the first chamber 204 and secured to the main flow channel 200 as shown. In this configuration, the first microbridge sensor is exposed to the fluid of interest with substantially zero flow. The first microbridge sensor 210 is typically used to measure fluid properties such as thermal conductivity, thermal diffusivity, specific heat, temperature and pressure.

A second sensor 222 is positioned in a small bypass channel 214. In this configuration, the second microbridge sensor is exposed to the flow of the fluid of interest. The second microbridge sensor 222 is typically used to measure fluid velocity.

Figure 5:
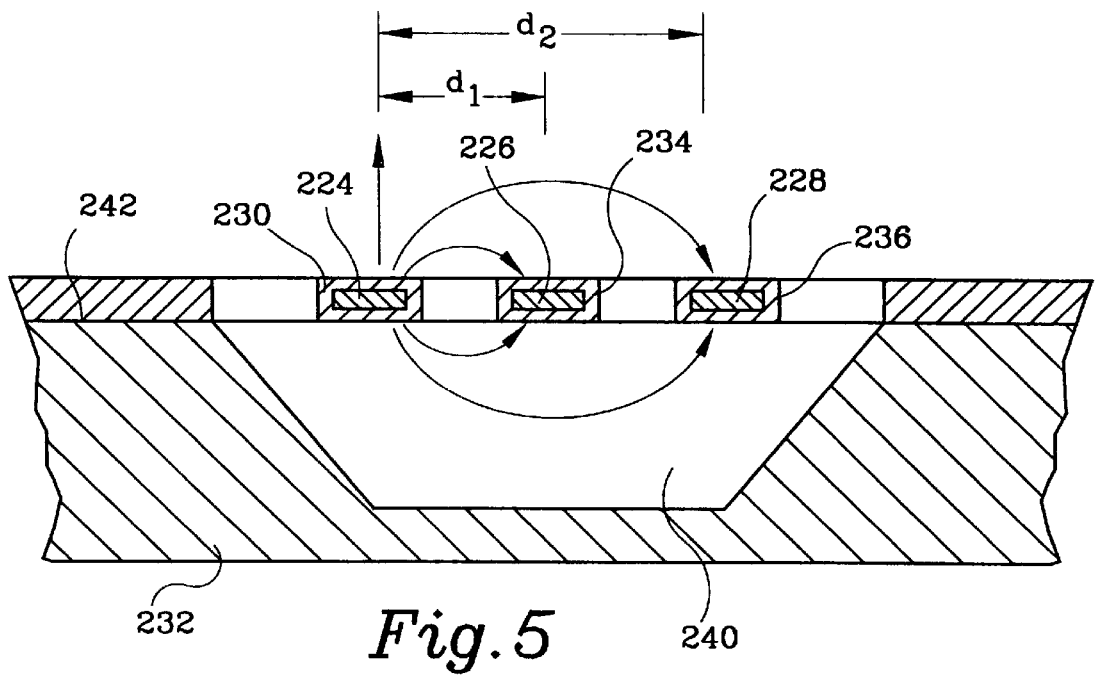
FIG. 5 is a first illustrative cross sectional view of a microbridge sensor in accordance with the present invention having two downstream sensor elements.

FIG. 5 is a first illustrative cross sectional view of a microbridge sensor in accordance with the present invention, having two downstream sensor elements. As indicated above, the present invention provides apparatus and methods for determining the fluid velocity relatively independently of the physical properties of the fluid, and may also minimize the effects of the non-zero heater time lag and/or the non-zero sensor time lag for increased accuracy.

Generally, the present invention includes a heater element 224 and at least two spaced sensor elements 226 and 228. The sensor elements 226 and 228 are preferably spaced different distances from the heater element 224. In the illustrative diagram, sensor 226 is spaced a first distance "$d_1$" from the heater element 224, and sensor 228 is spaced a second distance "$d_2$" from the heater element 224. Both sensor 226 and 228 are shown downstream from the heater element 224.

The heater element 224, sensor element 226 and sensor element 228 are preferably disposed in and closely coupled to a fluid medium (fluid or gas) of interest. A time-varying input signal is provided to the heater element 224, which heats the surrounding fluid. Of interest is the transit time for the temperature disturbance in the fluid to travel from the heater element 224 to each of the sensor elements 226 and 228. The fluid velocity can be calculated from this transit time value, relatively independently from the fluid properties.

The heater element 224 is shown having a support member 228 that supports the heater element 230 out of contact with the base substrate 232. Together, the heater element 224 and support member 230 form a heater film member. Likewise, the sensor element 226 is shown having a support member 234 that supports the sensor element 226 out of contact with the base substrate 230. Together, the sensor element 226 and support member 234 form a first sensor film member. Finally, the sensor element 228 is shown having a support member 236 that supports the sensor element 228 out of contact with the base substrate 230. Together, the sensor element 228 and support member 236 form a second sensor film member.

Heater element 224 and sensor elements 226 and 228 may be fabricated of any suitable, stable metal or alloy such as platinum, Nickel, Iron-Nickel, etc. Heater element 224 and sensor elements 226 and 228 may be any resistive element including a wire, but are preferably a film. Moreover, heater element 224 and sensor elements 226 and 228 may be of any shape including a grid pattern as described above, or simply a line. As indicated above, the heater element 224 and sensor elements 226 and 228 are preferably encapsulated in a thin film of dielectric, such as silicon nitride, $Si_3N_4$, to form the support members 230, 234 and 236.

An accurately defined fluid (gas or liquid) space 240 is preferably provided which effectively surrounds heater element 224 and sensor elements 226 and 228, and is achieved by fabricating the structure on silicon surface 242. Heater element 224 and sensor elements 226 and 228 preferably have thicknesses of approximately 0.08 to 0.12 micron, with line widths on the order to 5 microns and, if a grid is used, spaces between lines on the order of 5 microns. The fluid space 240 may be fabricated by subsequently etching an accurately defined fluid space of about 100 microns deep into silicon substrate 232 beneath heater element 224 and sensor elements 226 and 228.

Support member 230 and heater element 224 preferably connect to top surface 242 of semiconductor substrate 232 at one or more edges of depression or fluid space 240. Support member 230 and heater element 224 may bridge across depression 240 as shown, or alternately, for example, cantilevered over depression 240. The sensor elements 234 226 and 228 are preferably similarly constructed. It is recognized that any number of heater and sensor elements may be provided in a like manner. However, for illustration purposes, only one heater element 224 and two sensor elements 226 and 228 are shown in FIG. 5.

A heater input signal is preferably provided to the heater element 224, which induces a thermal disturbance in the fluid. Each of the sensor elements 226 and 228 sense the arrival of the thermal disturbance at their respective locations. Of interest is the transit times for the temperature disturbance to travel from the heater element 224 to each of the sensor elements 226 and 228. As described more fully below, because the sensor elements 226 and 228 are spaced at different distances from the heater element, the fluid velocity can be calculated relatively independently of the fluid properties.

Before providing the relation for fluid velocity as a function of the transit time values between the heater element and two sensor elements, namely $\Delta z_1$ and $\Delta z_2$, some background information is provided. The propagation or spread of a local, non-uniform temperature distribution can be derived from the following three-dimensional temperature diffusivity or heat conductivity equation, to which a term has been added to represent fluid velocity in the x-direction:

$$\delta T/\delta z = D_t \delta^2 T/\delta x^2 - V_x \delta T/\delta x \quad (1)$$

The one dimensional transient solution to equation (1) is:

$$T \sim z^{-0.5} \exp(-(d_i - vz)^2/(4D_t z)) \quad (2)$$

where "x" has been replaced by ($\pm d_i, \pm vz$) to include the fluid velocity term, and $d_i$ represents the distance from the heater to the "$i^{th}$" sensor. To determine the time lag between very short forcing functions at time z=0 and the arrival of these pulses in terms of maxima in T(z) at the sensor element position $d_i$, equation (2) is differentiated and set to zero:

$$dT/dz = 0 = -1/z^2 + (1/z)(2v(d_i - vz)/4D_t z + (d_i - vz)^2/4D_t z^2) \quad (3)$$

multiplying by $z^2$ and rearranging yields the relation:

$$-4D_t z - v^2 z^2 + d_i^2 = 0 \quad (4)$$

As shown by equation (4), choosing $d_1 = -d_2$ does not cause a change in the time lag because there is no linear term in d.

To determine a relation that is independent of the fluid properties, which are here represented by $D_t$ in equation (4), two unequal values of $d_i$ are considered, namely $d_1$ and $d_2$ ($d_1 \neq d_2$). This yields:

$$v^2 z_1 = d_1^2/z_1 - 4D_t \quad (5)$$

$$v^2 z_2 = d_2^2/z_2 - 4D_t \quad (6)$$

$$v^2 = (d_1^2/z_1 - d_2^2/z_2)/(z_1 - z_2) \quad (7)$$

Equation (7) has been found to accurately represent the fluid velocity over a wide range of fluid velocities from, for example, 16,384 cm/s down to 32 cm/s, relatively independently of the physical properties of the fluid. It is recognized that equation (7) may not model the physics at very low flow rates. At low flow rates, selected physical properties such as thermal diffusivity may become a factor. It is contemplated, however, that by properly locating the sensor elements, these effects can be minimized even at low flow rates, as further described below.

Figure 6:
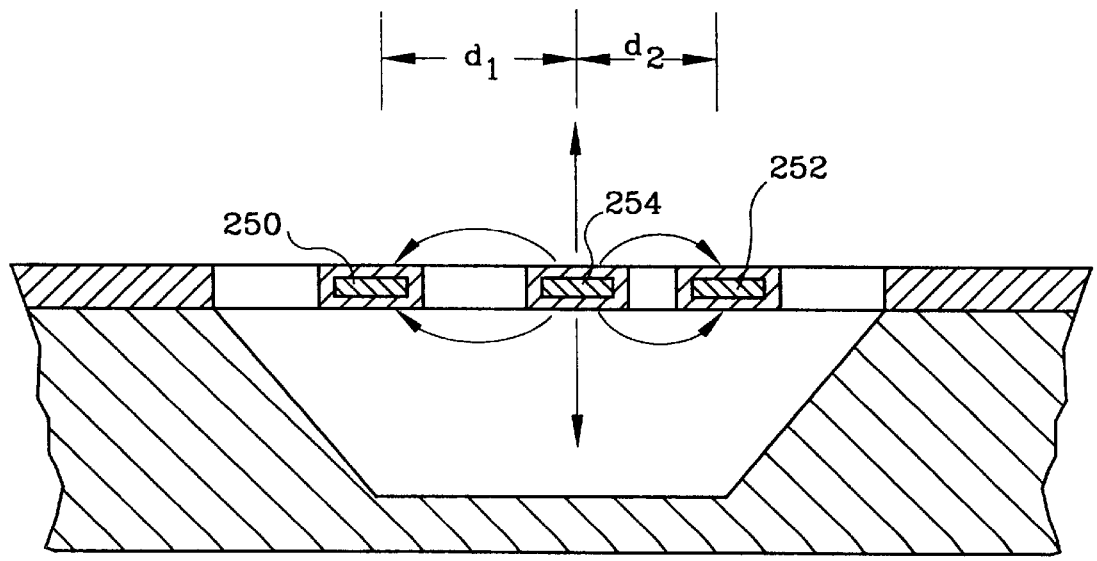
FIG. 6 is a second illustrative cross sectional view of a microbridge sensor in accordance with the present invention having an upstream and a downstream sensor element.

Rather than providing both sensors downstream from the heater element as shown in FIG. 5, it is contemplated that one sensor element 250 may be placed upstream and another sensor 252 may be placed downstream of the heater element 254, as shown in FIG. 6. To use equation (7), sensor 250 is spaced a different distance from the heater element 254 than sensor 252.

Figure 7:
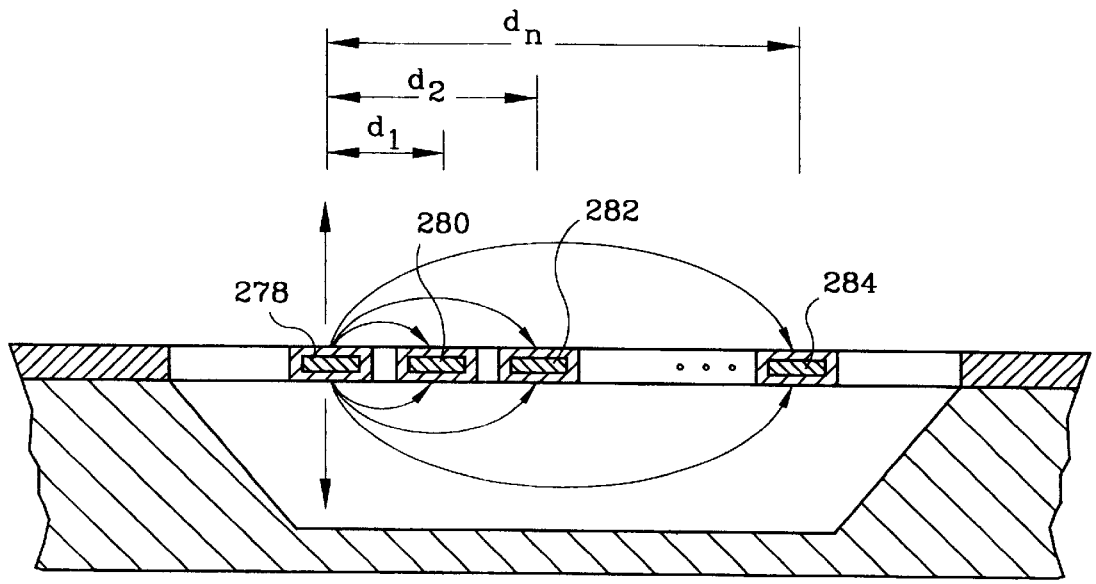
FIG. 7 is a third illustrative cross sectional view of a microbridge sensor in accordance with the present invention having more than two downstream sensor elements.

To reduce the possible negative effects of thermal diffusivity and other properties of the fluid at low flow rates, it is contemplated that a first set of sensor elements may be used for measuring low flow rates and another set may be used for higher flow rates. For example, in FIG. 7, those sensor that are positioned closest to the heater element, such as sensor elements 280 and 282, may be used to measure higher flow rates, as the thermal diffusivity component may be negligible at the higher flow rates. Likewise, sensor elements that are positioned further from the heater element may be used to measure the lower flow rates, including sensor 284. Using this approach, the effect of the thermal diffusivity component on the flow rate measurement may be minimized.

In addition, it is contemplated that a higher amplitude heater input signal may be provided when measuring high flow rates, and conversely, a lower amplitude heater input signal may be provided when measuring low flow rates. A higher amplitude temperature disturbance can be more easily detected, but can increases the speed of the thermal diffusivity component in the fluid. Thus, a lower amplitude heater input signal may reduce the speed of the thermal diffusivity component, and provide more accurate results at lower flow rates.

Figure 8:
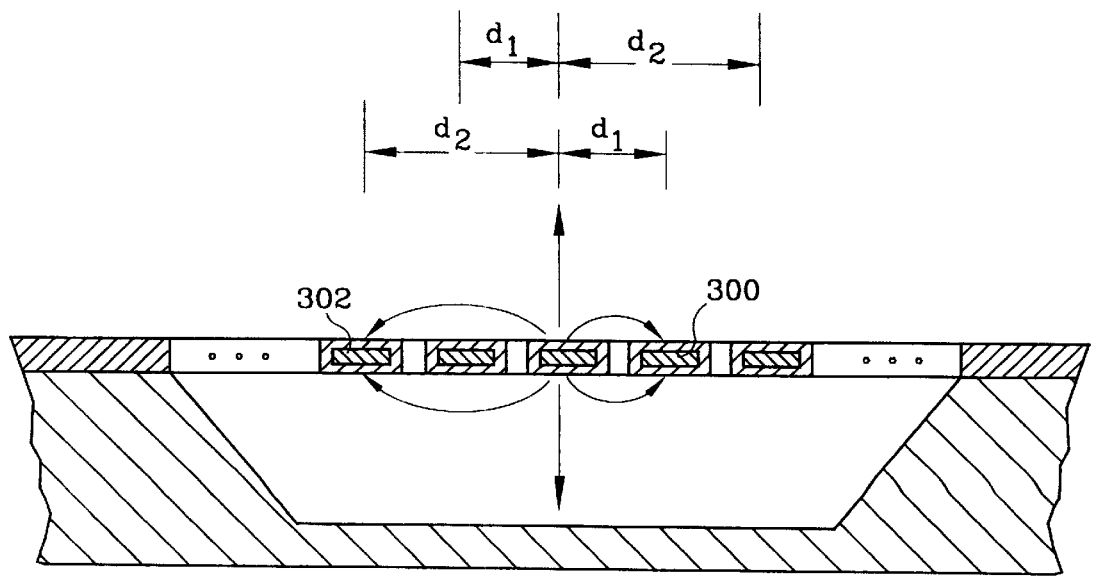
FIG. 8 is a fourth illustrative cross sectional view of a microbridge sensor in accordance with the present invention having a number of downstream and upstream sensor elements.

FIG. 8 is a fourth illustrative cross sectional view of a microbridge sensor in accordance with the present invention having a number of downstream and upstream sensor elements. In this embodiment, a number of sensor elements are equally spaced from the heater element both in an upstream and downstream direction. In operation, however, only the outputs of selected sensor elements that are spaced at different distances from the heater element are selected, and thus the fluid velocity may be obtained using equation (7). For example, the closest sensor element 300 in the downstream direction may be used in conjunction with the second closest sensor element 302 in the upstream direction. Other combinations are also contemplated.

One approach to measuring the transit time of the temperature disturbance from the heater element to a sensor element is to start a timer when the heater input signal crosses a predetermined threshold, and stop the timer when the temperature response of the sensor element crosses a predetermined threshold. As described above, the fluid velocity can be determined by using the transit time values for two or more sensors that are spaced at different distances from the heater element, relatively independent from the fluid properties.

Figure 9:
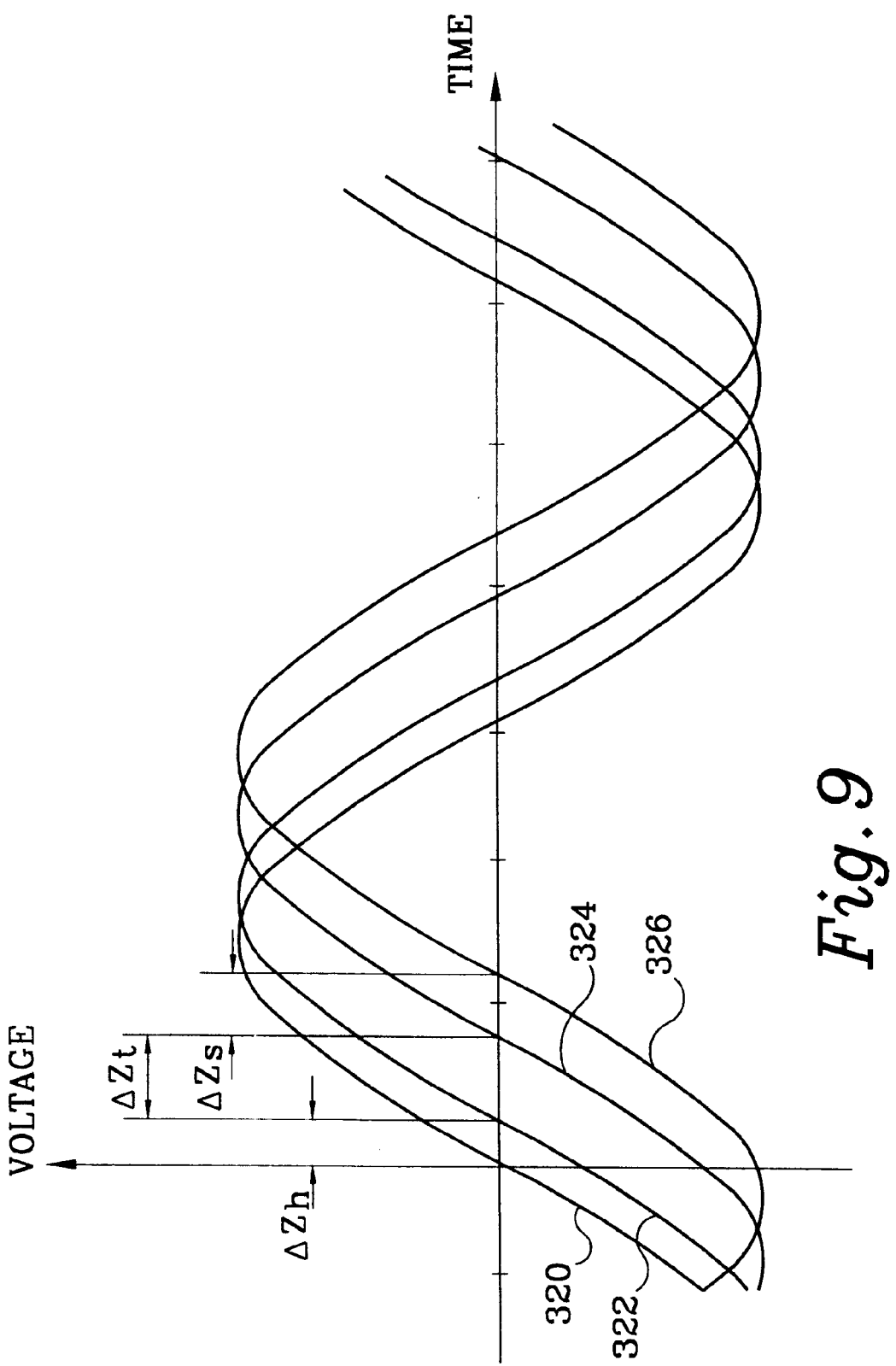
FIG. 9 is a timing diagram showing the desired transit time $\Delta z_t$, the heater lag time $\Delta z_h$, and the sensor lag time $\Delta z_s$.

While such an approach may be sufficient for many applications, several factors should be considered for higher precision applications. A first factor is the non-zero heater time lag $\Delta z_h$ between the heater input signal and the elevated temperature response of the heater element (and fluid). An illustrative heater input signal and elevated temperature response of the heater element are shown at 320 and 322 of FIG. 9, respectively. The heater time lag $\Delta z_h$ is typically dominated by the thermal conductivity, k, of the fluid of interest, at least for microbridge structures as contemplated by a preferred embodiment of the present invention. As discussed in U.S. patent application Ser. No. 80012/109/101, entitled "METHOD AND APPARATUS FOR MEASURING SELECTED PROPERTIES OF A FLUID OF INTEREST USING A SINGLE HEATER ELEMENT", the thermal conductivity, k, of the fluid of interest can be derived from the heater time lag, when measured with substantially zero fluid flow.

A second factor is the non-zero sensor time lag $\Delta z_s$ between the arrival of the temperature disturbance at the sensor element and the resistance change in the sensor element. That is, the temperature of the sensor element typically does not react instantaneously to a temperature change in the fluid, primarily because of the sensors non-zero thermal mass. This is explicitly shown in FIG. 9 wherein the arrival of the temperature disturbance at the sensor is shown at 324, and the resistive response of the sensor element is shown at 326.

One approach to reduce the negative impact of $\Delta z_h$ and $\Delta z_s$ is to measure the heater and sensor time lags during a calibration procedure. This can be accomplished by providing a heater input signal to the heater element, and a sensor input signal to each of the sensor elements under flow conditions. The heater time lag $\Delta z_h$ and each of the sensor time lags $\Delta z_s$ can then be determined by monitoring the transient temperature responses of the heater and sensor elements, respectively. To obtain a more accurate transit time $\Delta z_t$ for the temperature disturbance in the fluid, the heater time lag $\Delta z_h$ and the sensor time lag $\Delta z_s$ may then be subtracted from the time lag measured between the heater input signal and the temperature response of the corresponding sensor element.

Another approach is to provide heat to the sensor elements via sensor input signals during operation. The sensor input signals are preferably controlled to provide a frequency, phase and amplitude that produce a resulting temperature response in the corresponding sensor elements that tracks the temperature disturbance of the fluid. When this condition is satisfied, substantially zero heat is transferred from the fluid to the sensor element.

Figure 10A:
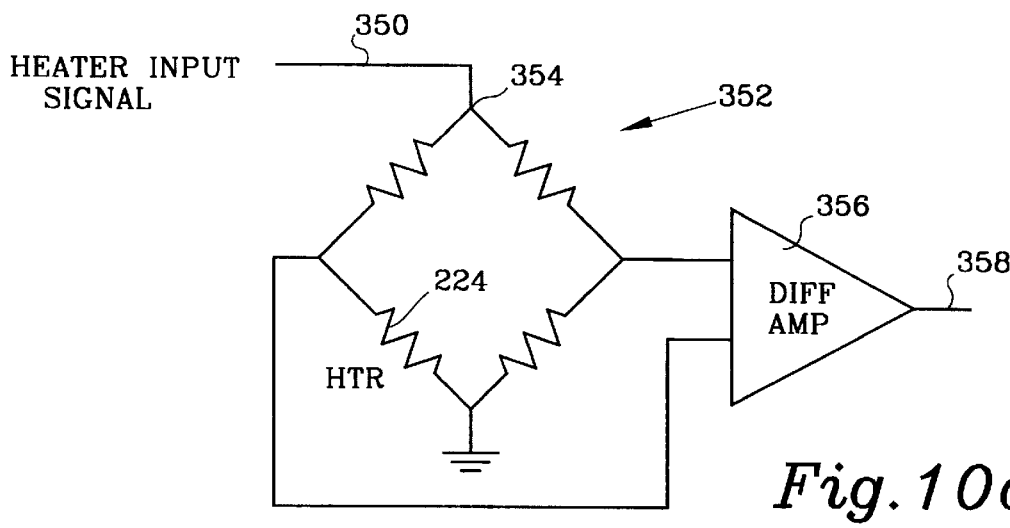
FIG. 10 is a schematic diagram of an illustrative circuit for use with the microbridge heater and sensor elements of, for example, FIG. 5.
Figure 10B:
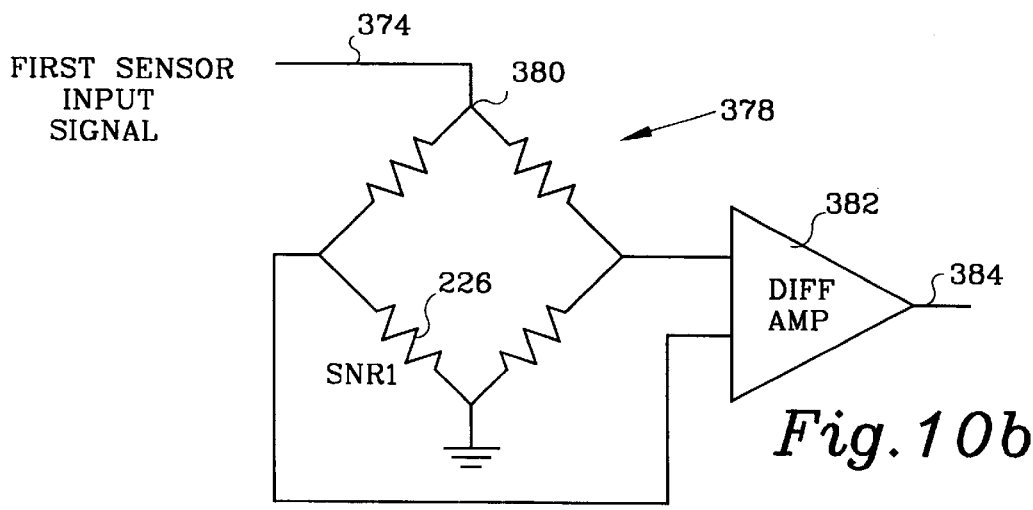
Figure 10C:
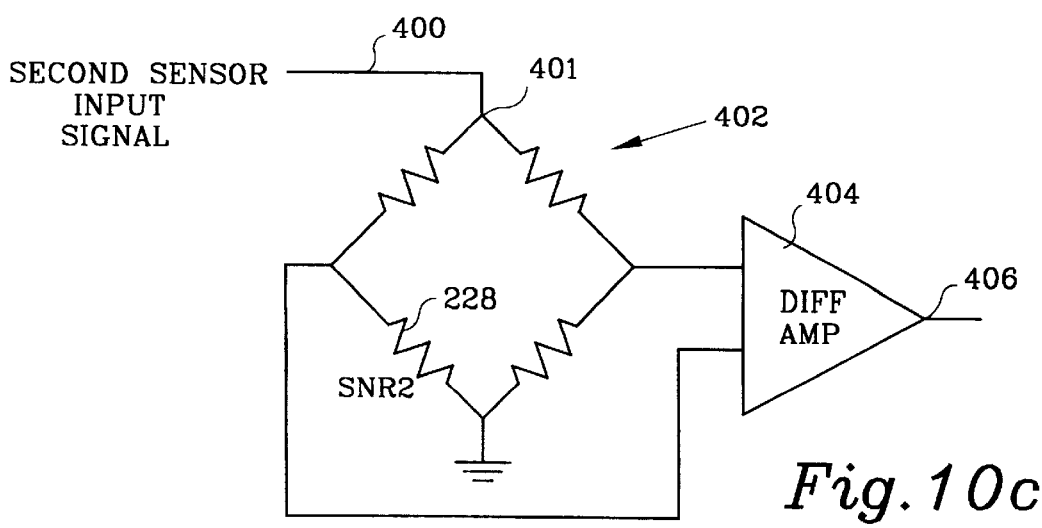

FIG. 10 is a schematic diagram of an illustrative circuit for use with the microbridge heater and sensor elements of, for example, FIG. 5. In accordance with the present invention, a periodic time-varying heater input signal 350 is provided to a heater element 224. The heater element 224 is disposed in and closely coupled to a fluid medium (gas or liquid) of interest. To simultaneously provide power to, and measure the resistance response of the heater element 224, the heater element 224 may be incorporated into one leg of a Wheatstone bridge 352, as shown. The time varying heater input signal 350 is provided to a power input terminal 354 of the Wheatstone bridge 352, which is either directly or indirectly coupled to the heater element 224. In this configuration, the Wheatstone bridge 352 provides a differential output signal that has an amplitude that is proportional to the resistance of the heater element 224. Preferably, the differential output signal is provided to a differential amplifier circuit 356 to provide an amplified output signal 358.

The heater input signal 350 provides power to the heater element 224 and induces a transient elevated temperature condition in the heater element 224 and the fluid of interest. Because the heater element 224 is closely coupled to the fluid, the thermal conductivity "k" of the fluid directly effect the time variable temperature response of the heater element 224. Further, the thermal conductivity of the fluid is typically dependent on the pressure and/or temperature of the fluid. Thus, it has been found that the thermal conductivity, pressure and/or temperature of the fluid of interest can be determined by examining a variable phase lag or time lag between the input signal 350 provided to the heater element 224 and a subsequent transient temperature response of the heater element 224 when measured with substantially zero fluid flow.

Likewise, a periodic time-varying sensor input signal 374 may be provided to a first sensor element 226. The first sensor element 226 is spaced from the heater element 224 and disposed in and closely coupled to a fluid medium (gas or liquid) of interest. To simultaneously provide power to, and measure the resistance response of the first sensor element 226, the first sensor element 226 may be incorporated into one leg of a Wheatstone bridge 378, as discussed above. The sensor input signal 374 is provided to a power input terminal 380 of the Wheatstone bridge 378, which is either directly or indirectly coupled to the first sensor element 226 as shown. In this configuration, the Wheatstone bridge 378 provides a differential output signal that has an amplitude that is proportional to the resistance of the first sensor element 226. Preferably, the differential output signal is provided to a differential amplifier circuit 382 to provide an amplified output signal 384.

Finally, it is contemplated that a periodic time-varying sensor input signal 400 may be provided to a second sensor element 228. The second sensor element 228 is spaced a different distance from the heater element 224 than the first sensor element 226. To simultaneously provide power to, and measure the resistance response of the second sensor element 228, the second sensor element 228 may be incorporated into one leg of a Wheatstone bridge 402, as discussed above. The sensor input signal 400 is provided to a power input terminal 401 of the Wheatstone bridge 402, which is either directly or indirectly coupled to the second sensor element 228 as shown. In this configuration, the Wheatstone bridge 402 provides a differential output signal that has an amplitude that is proportional to the resistance of the second sensor element 228. Preferably, the differential output signal is provided to a differential amplifier circuit 404 to provide an amplified output signal 406.

Using the circuit shown in FIG. 10, the heater time lag $\Delta z_h$ and the sensor time lags $\Delta z_{s1,2}$ can be determined by monitoring the transient temperature responses of the heater and sensor elements, respectively. To obtain a more accurate transit time $\Delta z_t$ for the temperature disturbance in the fluid during operation, the heater time lag $\Delta z_h$ and the corresponding sensor time lags $\Delta z_{s1,2}$ may be subtracted from the corresponding time lags measured between the heater input signal and the temperature response of the respective sensor elements.

Moreover, the circuit shown in FIG. 10 may be used to introduce heat into the sensor elements via the sensor input signals 374 and 400. The sensor input signals 374 and 400 are preferably controlled to provide a frequency, phase and amplitude that produce a resulting temperature response in the sensor elements 226 and 228 that tracks the temperature disturbance of the fluid. When this condition is satisfied, substantially zero heat is transferred from the fluid to the sensor elements 226 and 228.

FIG. 11 is a block diagram showing another illustrative embodiment of the present invention for obtaining various time lags values to determine the velocity, thermal conductivity, thermal diffusivity, and specific heat of a fluid of interest. In this embodiment, heat is introduced into the sensor elements via a corresponding sensor input signal during operation. The sensor input signals are controlled to provide a frequency, phase and amplitude that produce a resulting temperature response in the sensor elements that tracks the temperature disturbance of the fluid.

In this illustrative embodiment, both the heater input signal and the sensor input signals include a high frequency component and a lower frequency component. The lower frequency component preferably modulates the high frequency component. This construction allows an accurate dosage of power to be delivered to the heater element and the sensor elements, while eliminating frequency doubling effects that may occur without adding a DC component to the input signal. The high frequency component is preferably in the range of 0.1 to 3 MHZ, while the lower frequency component is preferably in the range of 30 to 200 Hz.

Figure 12:
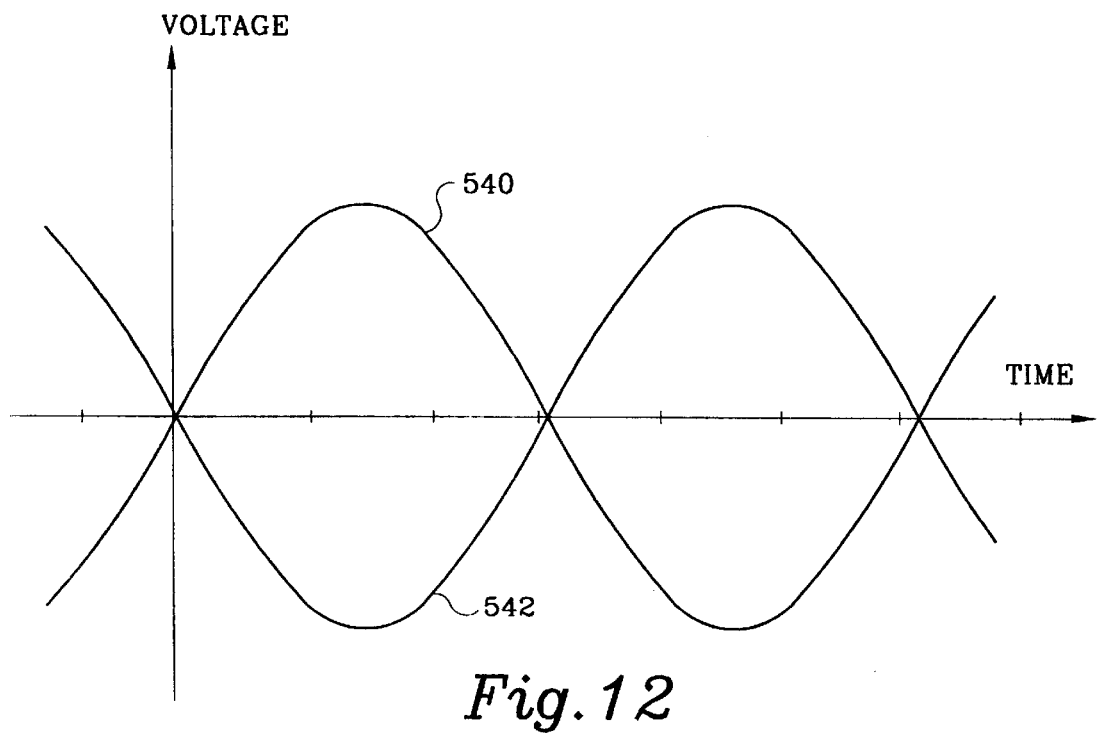
FIG. 12 is a timing diagram showing an illustrative input signal, and an inverted copy thereof, which are provided by the signal generators shown in FIG. 11A and FIG. 11B.
Figure 13:
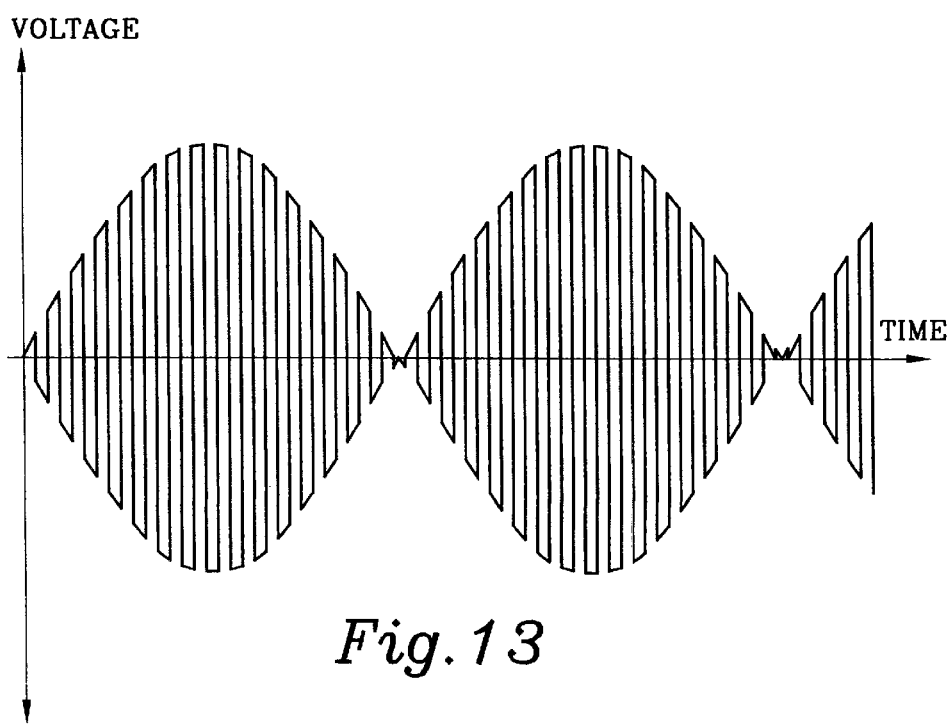
FIG. 13 is a timing diagram showing an illustrative high frequency signal modulated by the input signals of FIG. 12.
Figure 14:
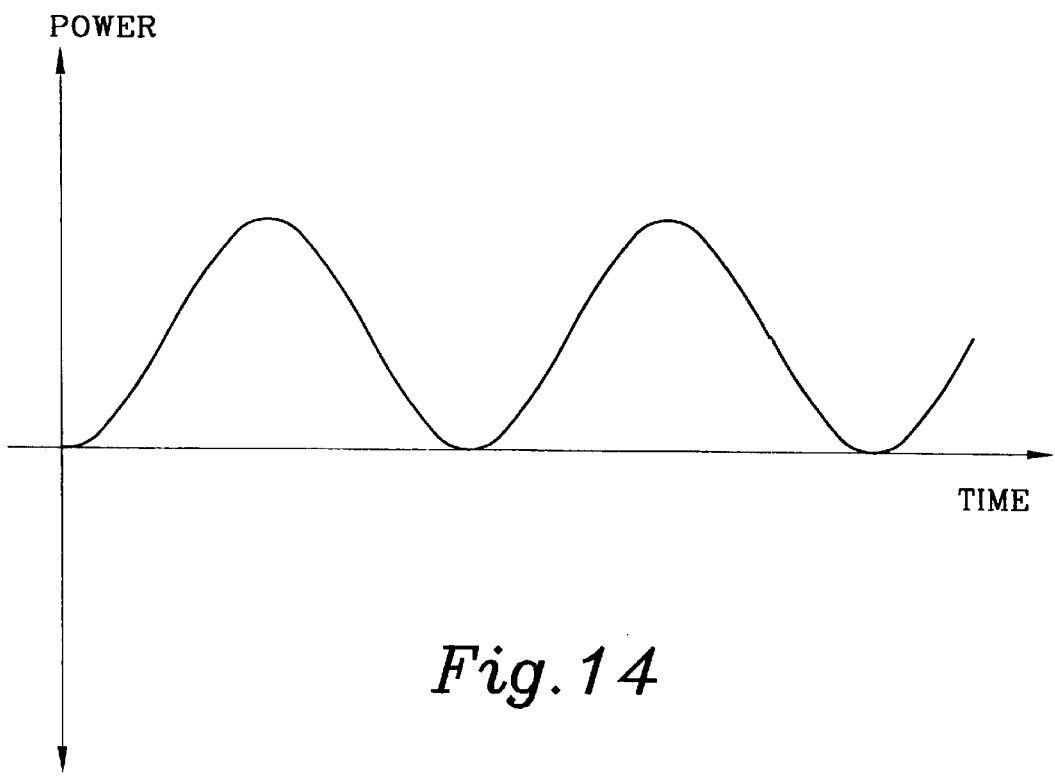
FIG. 14 is a timing diagram showing the power of the modulated input signal of FIG. 13.

With respect to the heater element, a first generator 500 generates and provides the high frequency component of the input signal to a modulator 502 via interface 504. The generator 500 also generates the lower frequency component, and an inverted copy thereof, and provides these signals to modulator 502 via interfaces 506 and 508, respectively. An illustrative lower frequency component 540 and inverted copy thereof 542 are shown in FIG. 12. The modulator 502 modulates the high frequency component using the lower frequency component signals to produce a modulated heater input signal. An illustrative modulated heater input signal is shown in FIG. 13. The power delivered by the modulated heater input signal is shown in FIG. 14.

The modulated heater input signal is provided to heater block 510. To simultaneously provide power to, and measure the resistance response of the heater element, the heater element is preferably provided in one leg of a Wheatstone bridge, for example as shown in FIG. 10. Thus, in the illustrative embodiment, the heater block 510 preferably includes a circuit similar to that shown in FIG. 10.

Figure 15:
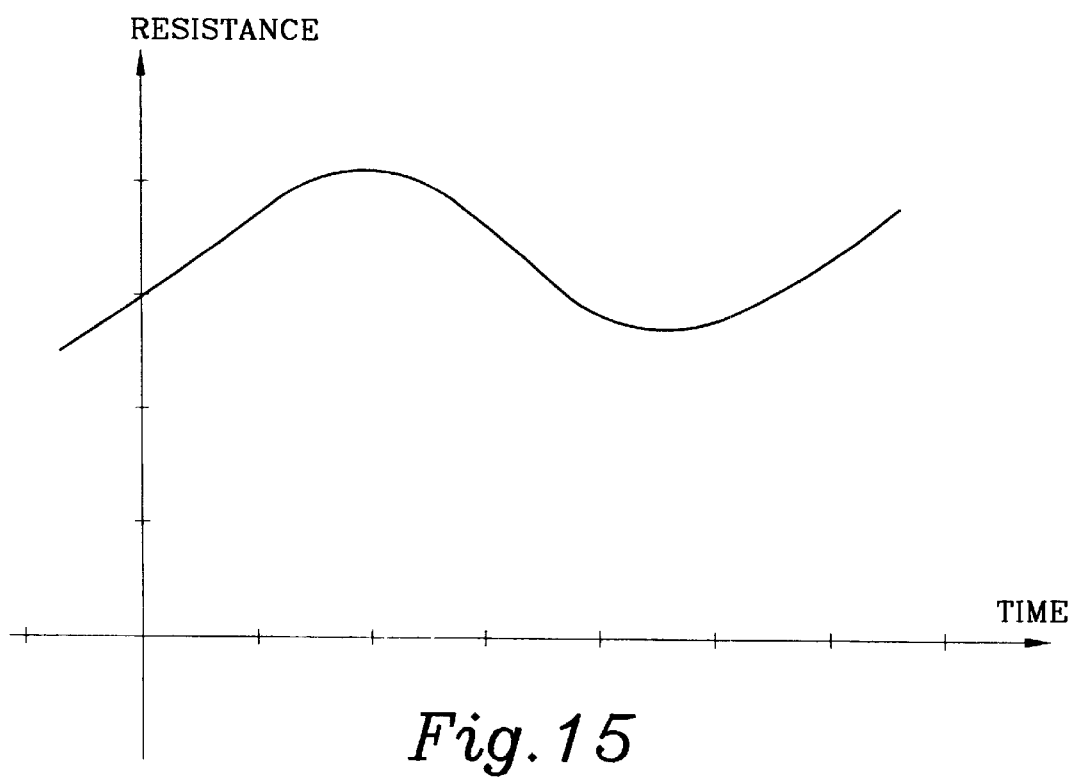
FIG. 15 is a timing diagram showing the resistance of the heater and/or sensor elements versus time when the power signal of FIG. 14 is provided thereto.

The modulated heater input signal is provided to a power input terminal of the Wheatstone bridge, such as power input terminal 354 of FIG. 10, which is either directly or indirectly coupled to the heater element. In this configuration, the Wheatstone bridge provides a differential output signal with an amplitude that is proportional to the resistance of the heater element. The differential output of the Wheatstone bridge may be provided to a differential amplifier, as shown in FIG. 10, or may be directly provided as the output of heater block 510. An illustrative transient resistance response of the heater element is shown in FIG. 15.

For accurate measurement of the heater resistance, the high frequency component may be removed from the heater output signal of the Wheatstone bridge using any number of techniques. One such technique is to provide a low-pass filter 512 at the output of the heater block 510 which allows only the lower frequency component of the heater output signal to pass. The resulting filtered signal may then be provided to a stop input of a first high frequency timer 514. Preferably, the heater output signal of the heater block 510 is AC coupled to the filter 512, as shown by capacitor 516. The filter 512 may provide the AC coupling function, or a separate element such as capacitor 516 may be provided.

The start input of the first high frequency timer 514 may be coupled to the lower frequency component of the heater input signal. More preferably, however, the lower frequency component of the heater input signal is coupled to the start input of the high frequency timer 514 via a bulk resistor 520 and a capacitor 522 as shown. In any case the start input of the high frequency timer 514 is responsive to the lower frequency component of the heater input signal. The bulk resistor 520 preferably has a low temperature coefficient to minimize any phase lag caused thereby. Capacitor 522 AC couples the lower frequency component of the input signal to the start input of the high frequency timer 514.

Because both the heater input signal and the heater output signal are preferably AC coupled to the timer start and stop inputs, respectively, of the timer 514, the zero crossing points of the heater input and output signals may be used to trigger the high frequency timer 514. This allows the time lag measurement of the high frequency timer 514 to be relatively independent of the amplitudes of the input and output signals, thereby increasing the accuracy of the measurement.

As can be seen from the above description, high frequency timer 514 starts when the AC coupled lower frequency component of the heater input signal crosses some predefined threshold, preferably zero. Likewise, high frequency timer 514 stops when the AC coupled heater output signal, which represents the resistance of the heater element, crosses some predefined threshold, preferably zero. The result is a heater time lag $\Delta z_h$. When the heater is exposed to a fluid at substantially zero flow, the heater time lag $\Delta z_h$ equals $\Delta z_{k,p}$. As described below, the thermal conductivity of the fluid can be determined from $\Delta z_{k,p}$.

In some applications, it may be desirable to control the amplitude of the transient elevated temperature condition of the heater element. This is preferably accomplished by providing an amplitude control signal that is indicative of the amplitude of the resistance change in the heater element. The amplitude control signal may be provided by a rectifier 526, which rectifies the filtered output signal as shown. The generator 500 may include an amplitude control block 530, which accept the amplitude control signal via interface 528, and adjusts the amplitude of the lower frequency component and the inverted copy thereof such that the amplitude of the resistance change in the heater element remains at a relatively constant level.

With respect to the first sensor element, a second generator 550 generates and provides the high frequency component of the sensor input signal to a modulator 552 via interface 554. The generator 550 also generates the lower frequency component, and an inverted copy thereof, and provides these signals to modulator 552 via interfaces 556 and 558, respectively. As described above, the modulator 552 modulates the high frequency component using the lower frequency component signals to produce a modulated sensor input signal as shown in FIG. 13. The power delivered by the modulated sensor input signal is shown in FIG. 14.

The modulated sensor input signal is provided to sensor block 560. To simultaneously provide power to, and measure the resistance response of the sensor element, the second sensor element is preferably provided in one leg of a Wheatstone bridge, for example as shown in FIG. 10. Thus, in the illustrative embodiment, the sensor block 560 preferably includes a circuit similar to that shown in FIG. 10.

The modulated sensor input signal is provided to a power input terminal of the Wheatstone bridge, such as power input terminal 380 of FIG. 10, which is either directly or indirectly coupled to the sensor element. In this configuration, the Wheatstone bridge provides a differential output signal with an amplitude that is proportional to the resistance of the sensor element. The differential output of the Wheatstone bridge may be provided to a differential amplifier, as shown in FIG. 10, or may be directly provided as the output of sensor block 560. An illustrative transient resistance response of the sensor element is shown in FIG. 15.

For accurate measurement of the sensor resistance, the high frequency component of the modulated heater input signal may be removed using any number of techniques. One such technique is to provide a low-pass filter 562 at the output of the sensor block 560 which only allows the lower frequency component of the sensor output signal to pass. The resulting filtered signal may then be provided to a stop input of a second high frequency timer 564. Preferably, the sensor output signal of the sensor block 560 is AC coupled to the filter 562, as shown by capacitor 566. The filter 562 may provide the AC coupling function, or a separate element such as capacitor 566 may be provided.

The start input of high frequency timer 564 may be coupled to the lower frequency component of the sensor input signal. More preferably, however, the lower frequency component of the heater input signal is coupled to the start input of the high frequency timer 564 via a bulk resistor 570 and a capacitor 572 as shown. The bulk resistor 570 preferably has a low temperature coefficient to minimize any phase lag caused thereby. Capacitor 572 AC couples the lower frequency component of the sensor input signal to the start input of the high frequency timer 564.

Because both the sensor input signal and the sensor output signal are AC coupled to the timer start and stop inputs, respectively, of the timer 564, the zero crossing points of the sensor input and output signals may be used to trigger the high frequency timer 564. This allows the time lag measurement of the high frequency timer 564 to be relatively independent of the amplitudes of the sensor input and output signals, thereby increasing the accuracy of the measurement.

As can be seen from the above description, high frequency timer 564 starts when the AC coupled lower frequency component of the sensor input signal crosses some predefined threshold, preferably zero. Likewise, high frequency timer 564 stops when the AC coupled sensor output signal, which represents the resistance of the second sensor element, crosses some predefined threshold, preferably zero. The result is a first sensor time lag $\Delta z_{s1}$.

Figure 16:
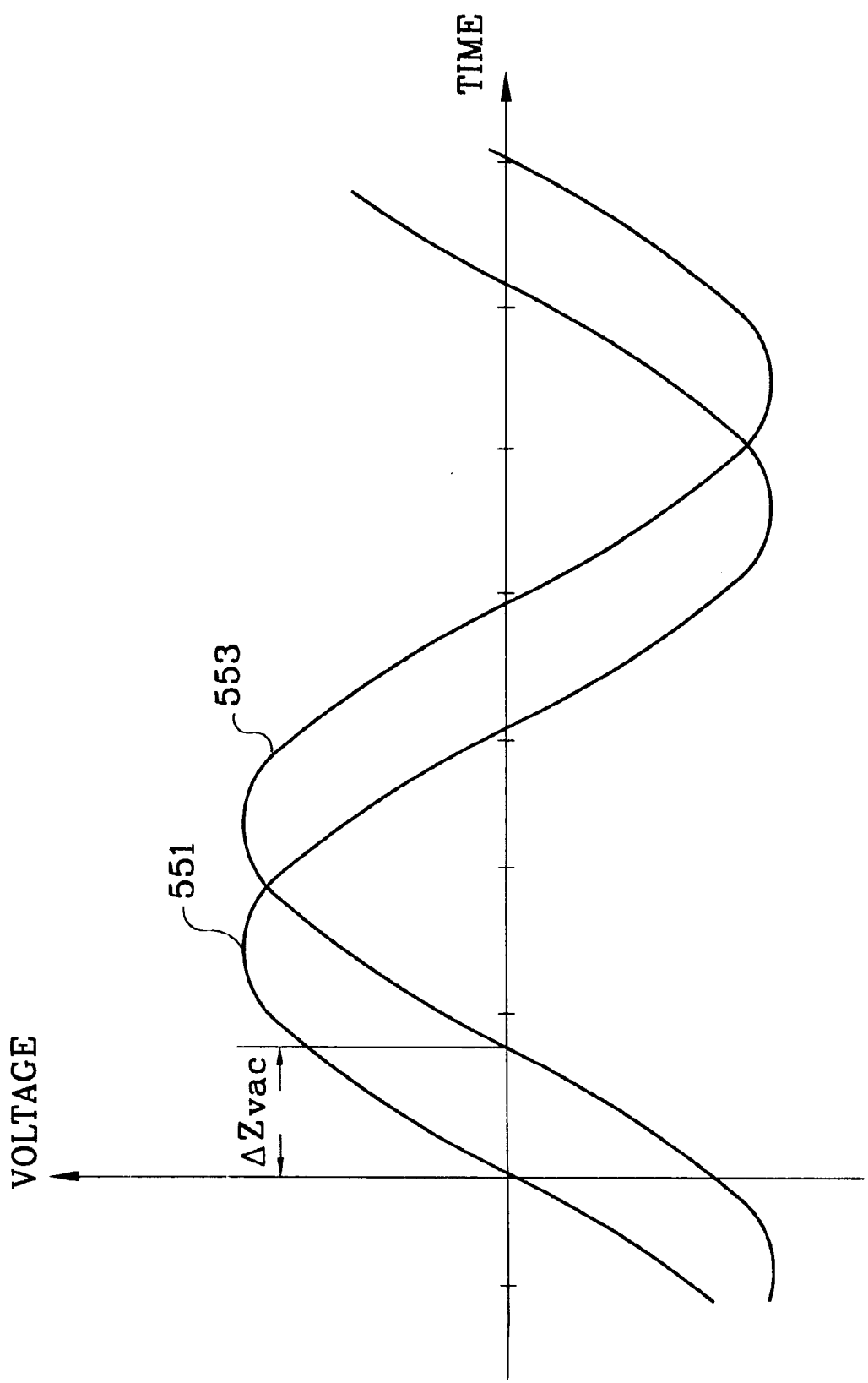
FIG. 16 is a timing diagram showing the sensor time lag $\Delta z_{svac}$ when measured under vacuum conditions.

To provide a sensor input signal that has the proper frequency, phase and amplitude to cause the resulting temperature response in the first sensor element to track the temperature disturbance of the fluid, a phase shifter 580 and analog divider 582 may be provided. The desired phase and amplitude of the sensor input signal can be determined during a calibration procedure. In a preferred embodiment, the sensor element is first subjected to a vacuum condition, and a sensor input signal is provided to the first sensor element as described above. Because no fluid surrounds the sensor element, substantially no heat is transferred from the sensor element to the fluid. A sensor time lag $\Delta z_{s1vac}$ is measured by the high frequency timer 564, and subsequently stored. An illustrative sensor time lag $\Delta z_{s1av}$ is shown in FIG. 16, and represents the delay between the sensor input signal 551 and the resistive response 553 of the sensor element. In addition, a power/resistance ratio between the sensor input signal and the resulting resistance response of the sensor element is measured and stored.

The sensor element is then subjected to a fluid of interest. During operation, the phase of the sensor input signal is adjusted by phase shifter 580 so that the resulting first sensor time lag $\Delta z_{s1}$, measured by high frequency timer 564, equals the sensor time lag measured under vacuum conditions $\Delta z_{s1vac}$. Generator 550 may include a comparator, processor or other means for comparing the measured time lag $\Delta z_{s1}$ and the calibrated time lag $\Delta z_{s1vac}$.

Likewise, the power of the input signal (P) and the resulting resistance response (R) of the first sensor element may be provided to analog divider 582, as shown. Analog divider 582 may divide these signals to provide a power/resistance ratio. Generator 550 may then adjust the amplitude of the first sensor input signal so that the resulting power/resistance ratio equals the power/resistance ratio recorded under vacuum conditions.

Accordingly, the first sensor input signal heats the first sensor element in phase and with the proper amplitude to match the temperature disturbance in the fluid such that substantially no heat is transferred from the fluid to the first sensor element. This may help reduce or eliminate the first sensor time lag $\Delta z_{s1}$ as a factor when determining the first transit time $\Delta z_1$ of the temperature disturbance.

Timer 590 directly measures the transit time $\Delta z_1$ of the temperature disturbance from the heater element to the first sensor element. Timer 590 is started when the response of the heater element crosses a predefined threshold, preferably zero. Timer 590 is stopped with the response of the first sensor element crosses a predefined threshold, preferably zero. Since the first sensor is tracking the temperature disturbance in the fluid, the first sensor time lag $\Delta z_{s1}$ is removed as an error source. When the first sensor is exposed to the fluid at substantially zero flow, the first sensor time lag $\Delta z_{s1}$ can be used to determine the thermal diffusivity and specific heat of the fluid, as further described below.

Finally, and with respect to the second sensor element, a third generator 600 generates and provides the high frequency component of the second sensor input signal to a modulator 602 via interface 604. The generator 600 also generates the lower frequency component, and an inverted copy thereof, and provides these signals to modulator 602 via interfaces 606 and 608, respectively. As described above, the modulator 602 modulates the high frequency component using the lower frequency component signals to produce a modulated sensor input signal as shown in FIG. 13. The power delivered by the modulated sensor input signal is shown in FIG. 14.

The modulated sensor input signal is provided to sensor block 610. To simultaneously provide power to, and measure the resistance response of the sensor element, the sensor element is preferably provided in one leg of a Wheatstone bridge, for example as shown in FIG. 10. Thus, in the illustrative embodiment, the sensor block 610 preferably includes a circuit similar to that shown in FIG. 10.

The modulated sensor input signal is provided to a power input terminal of the Wheatstone bridge, such as power input terminal 401 of FIG. 10, which is either directly or indirectly coupled to the sensor element. In this configuration, the Wheatstone bridge provides a differential output signal with an amplitude that is proportional to the resistance of the sensor element. The differential output of the Wheatstone bridge may be provided to a differential amplifier, as shown in FIG. 10, or may be directly provided as the output of sensor block 610. An illustrative transient resistance response of the sensor element is shown in FIG. 15.

For accurate measurement of the sensor resistance, the high frequency component of the modulated heater input signal may be removed using any number of techniques. One such technique is to provide a low-pass filter 612 at the output of the sensor block 610 which only allows the lower frequency component of the sensor output signal to pass. The resulting filtered signal may then be provided to a stop input of a second high frequency timer 614. Preferably, the sensor output signal of the sensor block 610 is AC coupled to the filter 612, as shown by capacitor 616. The filter 612 may provide the AC coupling function, or a separate element such as capacitor 616 may be provided.

The start input of the high frequency timer 614 may be coupled to the lower frequency component of the sensor input signal. More preferably, however, the lower frequency component of the sensor input signal is coupled to the start input of the high frequency timer 614 via a bulk resistor 620 and a capacitor 622 as shown. The bulk resistor 620 preferably has a low temperature coefficient to minimize any phase lag caused thereby. Capacitor 622 AC couples the lower frequency component of the sensor input signal to the start input of the high frequency timer 614.

Because both the sensor input signal and the sensor output signal are AC coupled to the timer start and stop inputs, respectively, of the timer 614, the zero crossing points of the sensor input and output signals may be used to trigger the high frequency timer 614. This allows the time lag measurement of the high frequency timer 614 to be relatively independent of the amplitudes of the sensor input and output signals, thereby increasing the accuracy of the measurement.

As can be seen from the above description, high frequency timer 614 starts when the AC coupled lower frequency component of the third sensor input signal crosses some predefined threshold, preferably zero. Likewise, high frequency timer 614 stops when the AC coupled sensor output signal, which represents the resistance of the third sensor element, crosses some predefined threshold, preferably zero. The result is a second sensor time lag $\Delta z_{s2}$.

To provide a sensor input signal that has the proper frequency, phase and amplitude to cause the resulting temperature response in the second sensor element to track the temperature disturbance of the fluid, a phase shifter 630 and analog divider 632 may be provided. The desired phase and amplitude of the sensor input signal can be determined during a calibration procedure. In a preferred embodiment, the second sensor element is first subjected to a vacuum condition, and a sensor input signal is provided to the second sensor element as described above. Because no fluid surrounds the sensor element, substantially no heat is transferred from the sensor element to the fluid. A second sensor time lag $\Delta z_{s2vac}$ is measured by the high frequency timer 614, and subsequently stored. An illustrative second sensor time lag $\Delta z_{s2vac}$ is shown in FIG. 16, and represents the delay between the sensor input signal 551 and the resistive response 553 of the second sensor element. In addition, a power/resistance ratio between the sensor input signal and the resulting resistance response of the second sensor element is measured and stored.

The third sensor element is then subjected to a fluid of interest. During operation, the phase of the sensor input signal is adjusted by phase shifter 630 so that the resulting second sensor time lag $\Delta z_{s2}$, measured by high frequency timer 614, equals the second sensor time lag measured under vacuum conditions $\Delta z_{2vac}$. Generator 600 may include a comparator, processor or other means for comparing the measured time lag $\Delta z_{s2}$ and the calibrated time lag $\Delta z_{s2vac}$.

Likewise, the power of the input signal (P) and the resulting resistance response (R) of the second sensor element may be provided to analog divider 632, as shown. Analog divider 632 may divide these signals to provide a power/resistance ratio. Generator 600 may then adjust the amplitude of the second sensor input signal so that the resulting power/resistance ratio equals the power/resistance ratio recorded under vacuum conditions.

Accordingly, the second sensor input signal heats the second sensor element in phase and with the proper amplitude to match the temperature disturbance in the fluid such that substantially no heat is transferred from the fluid to the second sensor element. This may help reduce or eliminate the second sensor time lag $\Delta z_{s2}$ as a potential error source when determining the transit time of the temperature disturbance.

Timer 650 directly measures the transit time $\Delta z_2$ of the temperature disturbance from the heater element to the second sensor element. Timer 650 is started when the response of the heater element crosses a predefined threshold, preferably zero. Timer 650 is stopped with the response of the second sensor element crosses a predefined threshold, preferably zero. Since the second sensor is tracking the temperature disturbance in the fluid, the sensor time lag $\Delta z_{s2}$ is eliminated as an error source.

The velocity of the fluid can be determined from the transit time values $\Delta z_1$ and $\Delta z_2$ using the above-described relation:

$$v^2 = (d_1^2/z_1 - d_2^2/z_2)/(z_1 - z_2) \tag{8}$$

Figure 11A:
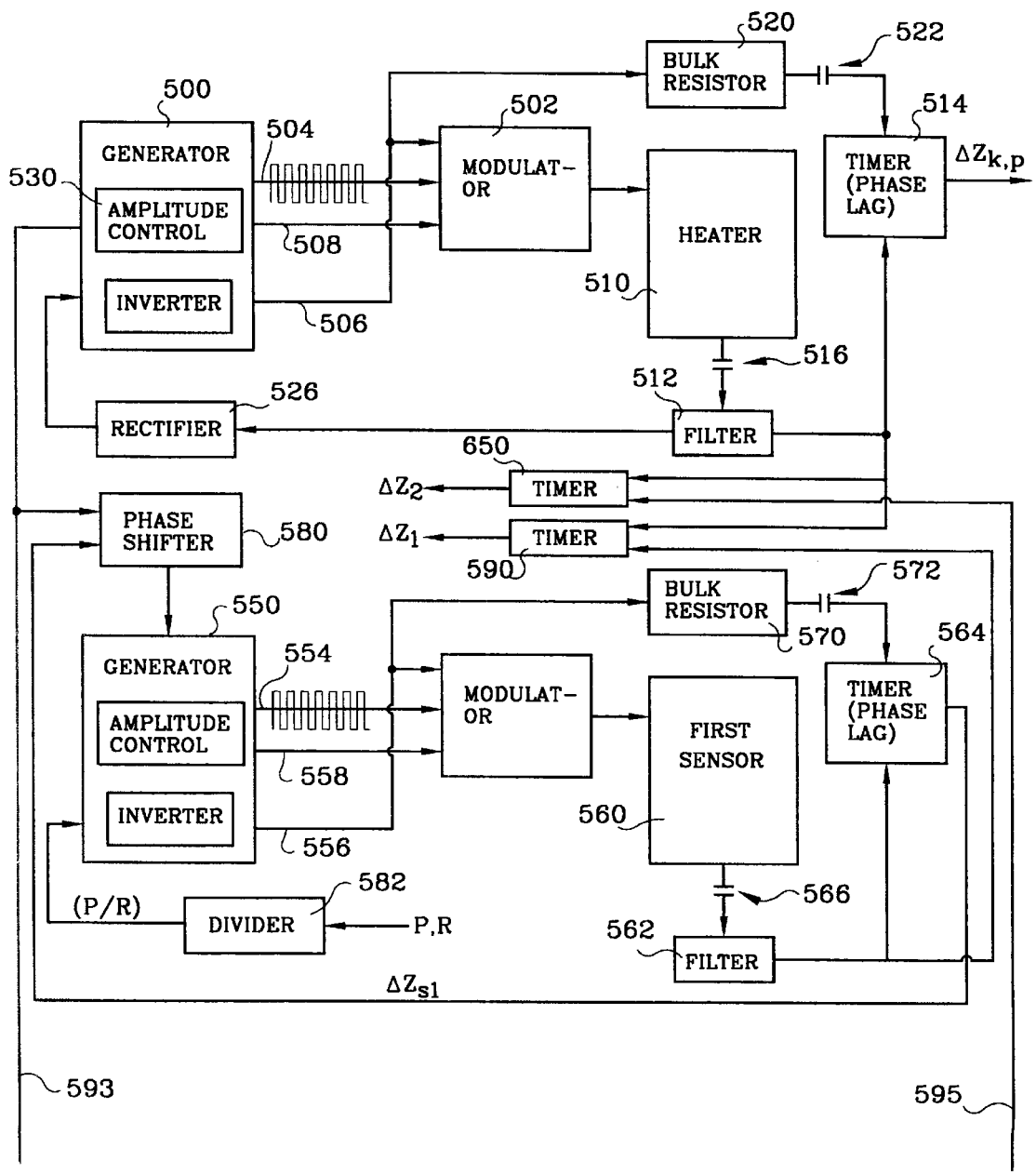
FIG. 11A and FIG. 11B are a block diagram showing another illustrative embodiment of the present invention for obtaining the various time lags that are used to determine the velocity, the thermal conductivity, thermal diffusivity, and specific heat of the fluid of interest.
Figure 11B:
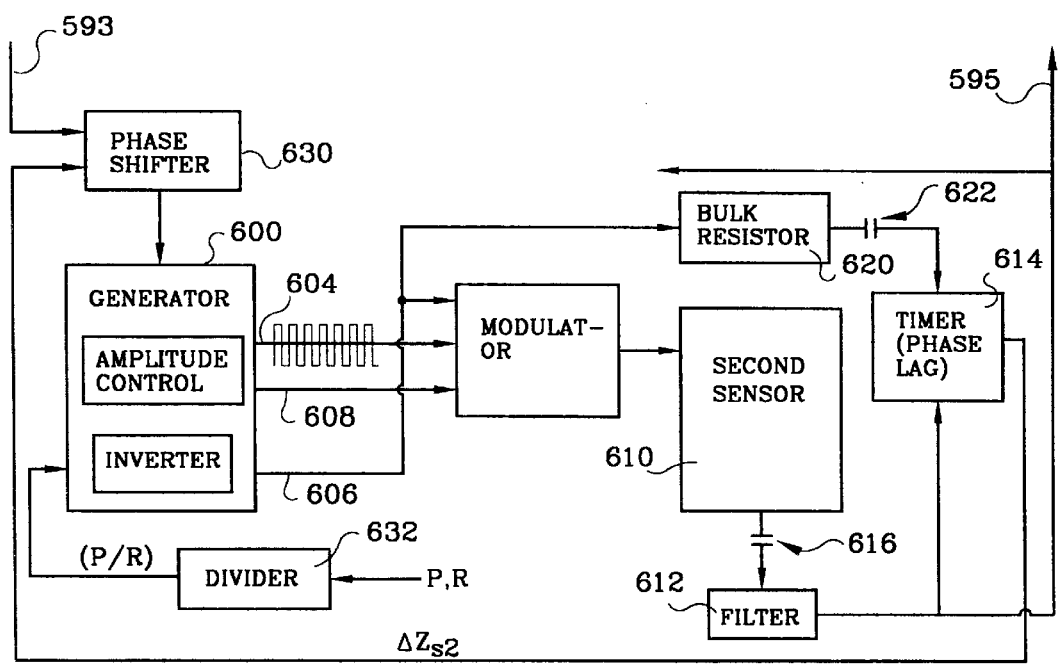

Thus, the illustrative embodiment of FIG. 11A and FIG. 11B can be used to calculate the velocity of the fluid of interest relatively independently of the properties of the fluid, while minimizing the effects of the heater and sensor time lags.

Further, the illustrative embodiment of FIG. 11A and FIG. 11B can be used to determine the thermal conductivity, thermal diffusivity and specific heat of the fluid of interest, as described more fully below.

THERMAL CONDUCTIVITY

The thermal dynamic interaction between a heater element that is forced to experience fluctuating temperatures of:

$$T = T_0 + T_1 \sin(\omega z + \gamma) \tag{9}$$

in response to a fluctuating input power $$P = P_0(1 + \sin(\omega z)) \tag{10}$$

can be described by a simple differential equation $$c_{pv} t \, dT/dz = P_0(1 + \sin(\omega z)) - (h_1 + h_2)(T - T_f) - h_3(T - T_b) \tag{11}$$

TABLE I

| Symbol | Nomenclature |
| --- | --- |
| f | frequency of the input signal, $H_z$ |
| ω | $2\pi f$, $H_z$ |
| $C_{pv}$ | specific heat per unit volume for the heater film and support member (10% Platinum, 90% $Si_3N_4$ Microbridge composite, j/ ($cm^3$k) |
| t | heater film thickness, cm |
| T | sensor base temperature, with peak-to-peak amplitude of $2T_0$, k |
| $T_f$ | fluid temperature, k |
| $T_b$ | substrate temperature, k |
| $h_1$ | coefficient of conductive heat transfer to the fluid of interest (= $k/L_1$), $W/cm^3$ |
| $h_2$ | coefficient of forced convective heat transfer to the fluid of interest under laminar flow (= $k/L_2$), $W/cm^3$ |
| $h_3$ | coefficient of conductive heat transfer to the substrate, $W/cm^3$ |
| $L_1$ | characteristic length of thermal conduction from the heater element into the fluid phase, cm |
| $L_2$ | characteristic length of convective heat transfer, cm |
| z | time, s |
| T | Temperature |
| $\Delta Z_{k,p}$ | time lag between the heater input signal and the resistance response of the heater means when measured with substantially zero fluid flow |
| $\Delta Z_h$ | time lag between the heater input signal and the resistance response of the heater means when measured with fluid flow |
| $\Delta Z_s$ | time lag between the sensor input signal and the resistance response of the corresponding sensor means when measured with fluid flow |
| $\Delta Z_{svac}$ | time lag between the sensor input signal and the resistance response of the sensor means under vacuum conditions |
| $\Delta Z_1$ | time lag required for a thermal disturbance to travel between the heater and the first sensor |
| $\Delta Z_2$ | time lag required for a thermal disturbance to travel between the heater and the second sensor |
| $d_1$ | separation distance between the heater element and the first sensor element |
| $d_2$ | separation distance between the heater element and the second sensor element (d1 d2) |
| Y | phase lag between input signal and the resistance of the heater means (γ = $\Delta Z.2\pi f$), radians |

Integration of equation (11) leads to the solution for the phase lag, γ, and the DC and AC signal amplitudes, $T_0$ and $T_1$, respectively as follows:

$$\gamma = \arctan(-2\pi f c_{pv} t/(h_1+h_2+h_3)) \quad (12)$$

$$\Delta z = \gamma/(2\pi f) \quad (13)$$

$$T_0 = ((h_1+h_2)T_f + h_3 T_b + P_0)/(h_1+h_2+h_3) \quad (14)$$

$$T_1 = P_0/((h_1+h_2+h_3)^2 + (c_{pv} t \omega)^2)^{1/2} \quad (15)$$

The contributions of $h_1$, $h_2$ and $h_3$ to the phase lag γ can be isolated and individually measured. During a calibration procedure, for example, the value of $h_3$ can be determined by subjecting the heater element to a vacuum condition, thereby reducing $h_1$ and $h_2$ to zero. A time lag value may then be measured between the input signal and the output signal of the heater element under the vacuum condition. The value of $h_3$ may then be calculated using the relation:

$$h_3 = -2\pi f c_{pv} t/\tan(\gamma) \quad (16)$$

The value of $h_1$ may then be determined by subjecting the heater element to the fluid of interest at atmospheric pressure and substantially zero flow, thereby reducing $h_2$ to zero. A time lag can then be measured between the input signal and the output signal of the heater element under atmospheric pressure. The value of $h_1$ can then be calculated using the relation:

$$h_1 = [-2\pi f c_{pv} t/\tan(\gamma)] - h_3 \quad (17)$$

where $h_3$ is known from above.

Finally, the value of $h_2$ may be determined by subjecting the heater means to the fluid of interest at a predetermined non-zero flow rate. A time lag can then be measured between the input signal and the output signal of the heater means under the non-zero flow condition. The value of $h_2$ can then be calculated using the relation:

$$h_2 = [-2\pi f c_{pv} t/\tan(\gamma)] - h_1 - h_3 \quad (18)$$

where $h_2$ and $h_3$ are known from above.

In the illustrative embodiment shown in, for example, FIG. 5, the heater element 224 and the support member 230 have a corresponding specific heat value, $C_{pv}$. Further, the heater element 224 has a coefficient of conductive heat transfer to the substrate 232, $h_3$. Once these parameters are determined, for example by prior calibration as described above, the thermal conductivity, k, of the fluid of interest can be determined using the relation:

$$k = (-2\pi f c_{pv} t/\tan(\Delta z_{k,p} \cdot 2\pi f) - h_3) L_1 \quad (19)$$

THERMAL DIFFUSIVITY AND SPECIFIC HEAT

The propagation or spread of a local, non-uniform temperature distribution can be derived from the following three-dimensional temperature diffusivity or heat conductivity equation, to which a term has been added to represent fluid velocity in the x-direction:

$$\delta T/\delta z = D_t \delta^2 T/\delta x^2 - v_x \delta T/\delta x \quad (20)$$

The one dimensional transient solution to equation (20) is:

$$T \sim z^{-0.5} \exp(-(d_1-vz)^2/(4D_t z)) \quad (21)$$

where x has been replaced by ($\pm d_1 \pm vz$) to include the velocity term. To determine the time lag between very short forcing functions at time z=0, and the arrival of these pulses in terms of maxima in T(z) at the first sensor element position $d_1$, equation (21) is differentiated and set to zero:

$$dT/dz = 0 = -1/z^2 + (1/z)(2v(d_1-vz)/4D_t z + (d_1-vz)^2/4D_t z^2 \quad (22)$$

multiplying by $z^2$ and rearranging yields the relation:

$$-4D_t z - v^2 z^2 + d_1^2 = 0 \quad (23)$$

Because the thermal conductivity, thermal diffusivity and specific heat of the fluid of interest are preferably determined at substantially zero flow, v is set to zero, resulting in the following relation for $D_t$:

$$D_t = d_1^2/(4\Delta z_1) \tag{24}$$

where z has been replaced by $\Delta z_1$, which represents the transit time for the temperature disturbance to travel a distance $d_1$, or in this case, from the heater element to the first sensor element.

The specific heat of the fluid of interest may then be determined using the relation:

$$c_p = k/D_t \tag{25}$$

where the thermal conductivity, k, and the thermal diffusivity, $D_t$, are determined as described above.

Figure 17:
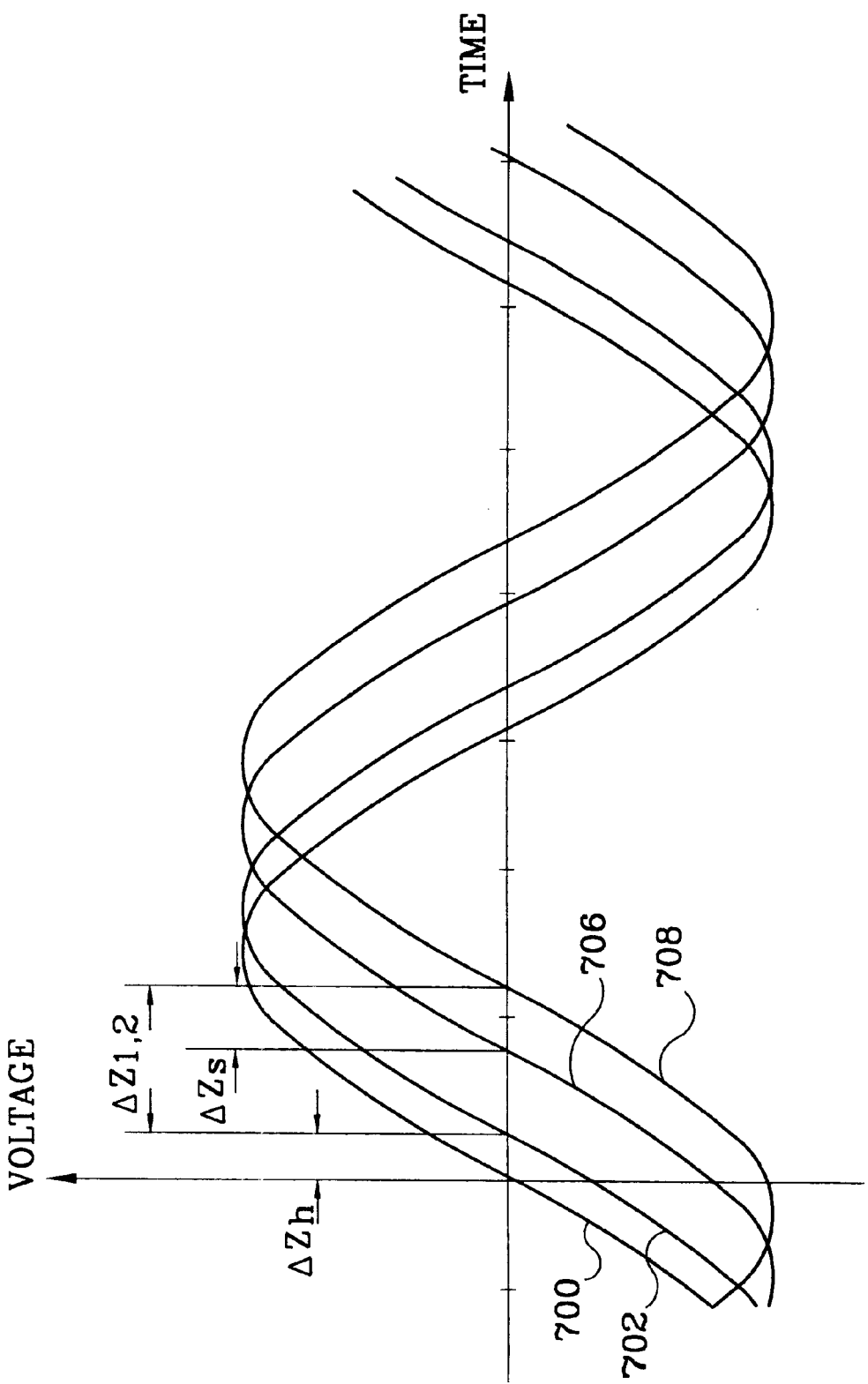
FIG. 17 is a timing diagram showing the various time lags measured by the embodiment of FIG. 11A and FIG. 11B.

FIG. 17 is a timing diagram showing the various time lags measured by the embodiment of FIG. 11A and FIG. 11B. The heater time lag value measured with substantially zero flow $\Delta z_{k,p}$ is determined as described above, and represents the time lag between the heater input signal shown at 700 and the response of the heater element shown at 702. The heater time lag $\Delta z_{k,p}$ is preferably used to calculate the thermal conductivity of the fluid of interest.

The sensor time lags $\Delta z_{s1}$ and $\Delta z_{s2}$ are preferably forced to match the sensor time lag values measured under vacuum conditions $\Delta z_{s1,2vac}$. Thus, the sensor input signal shown at 708 is provided with the proper phase relative to the heater input signal, and with the proper amplitude, so that the substantially no heat is transferred from the fluid to the corresponding sensor element. The temperature response of the corresponding sensor element is shown at 708.

The first transit time $\Delta z_1$ is the time lag between the heater response and the sensor response of the first sensor, preferably with $\Delta z_{s1} = \Delta z_{s1vac}$ as shown. As described above, the transit time $\Delta z_1$ can be used to calculate the thermal diffusivity and the specific heat of the fluid of interest, when measured with substantially zero fluid flow. The transit time $\Delta z_2$ is the time lag between the heater response and the sensor response of the second sensor, preferably with $\Delta z_{s2} = \Delta z_{s2vac}$ as shown. The transit time $\Delta z_2$ can also be used to calculate the thermal diffusivity and the specific heat of the fluid of interest when measured with substantially zero fluid flow. Finally, the transit times $\Delta z_1$ and $\Delta z_2$ can be used to determine the velocity of the fluid with flow, relatively independently of the properties of the fluid.

It is contemplated that the heater and sensor input signals may be active during a measurement period, and inactive during a wait period. Further, it is contemplated that the wait period may be longer than the measurement period. This may conserve power, which may be particularly important when the sensor system is battery powered.

Figure 18:
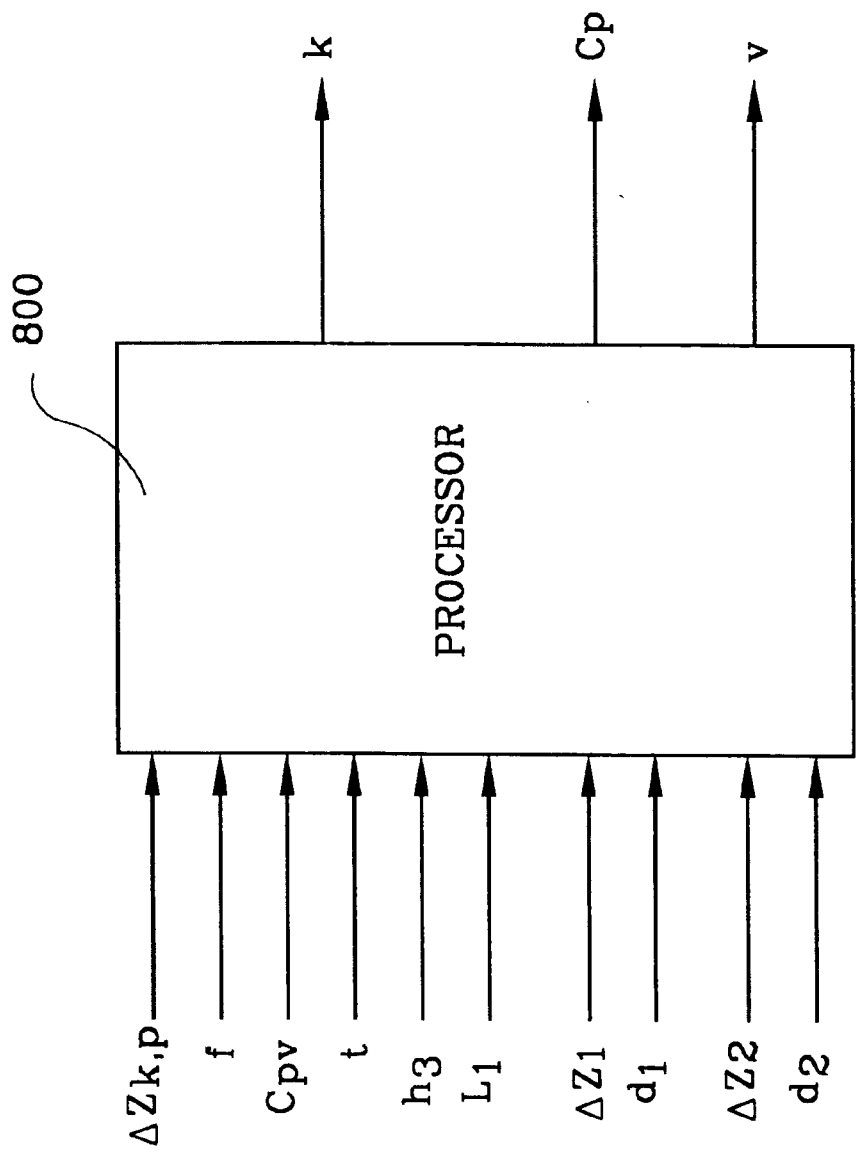
FIG. 18 is a block diagram showing a processing means that is used for calculating the velocity, thermal conductivity and specific heat of the fluid of interest using the time lag values provided by FIG. 11A and FIG. 11B.

FIG. 18 is a block diagram showing a processing means that is used for calculating the velocity, thermal conductivity and specific heat of the fluid of interest using the time lag values provided by FIG. 11A and FIG. 11B. Using the above-described relations, processing means 800 may accept $\Delta z_{k,p}$, f, $c_{pv}$, t, h3 and L1 to calculate the thermal conductivity, k, of the fluid of interest. Likewise, processing means 800 may use the thermal conductivity, k, one of the transit times such as $\Delta z_1$ when measured with substantially zero fluid flow, and the distance between the heater and the corresponding sensor "d" to determine the thermal diffusivity and specific heat of the fluid of interest.

Finally, processing means 800 may use the first and second transit times $\Delta z_1$ and $\Delta z_2$ when measured with fluid flow, along with the distances between the heater element and the corresponding sensor elements $d_1$ and $d_2$, to determine the velocity of the fluid.

Figure 19:
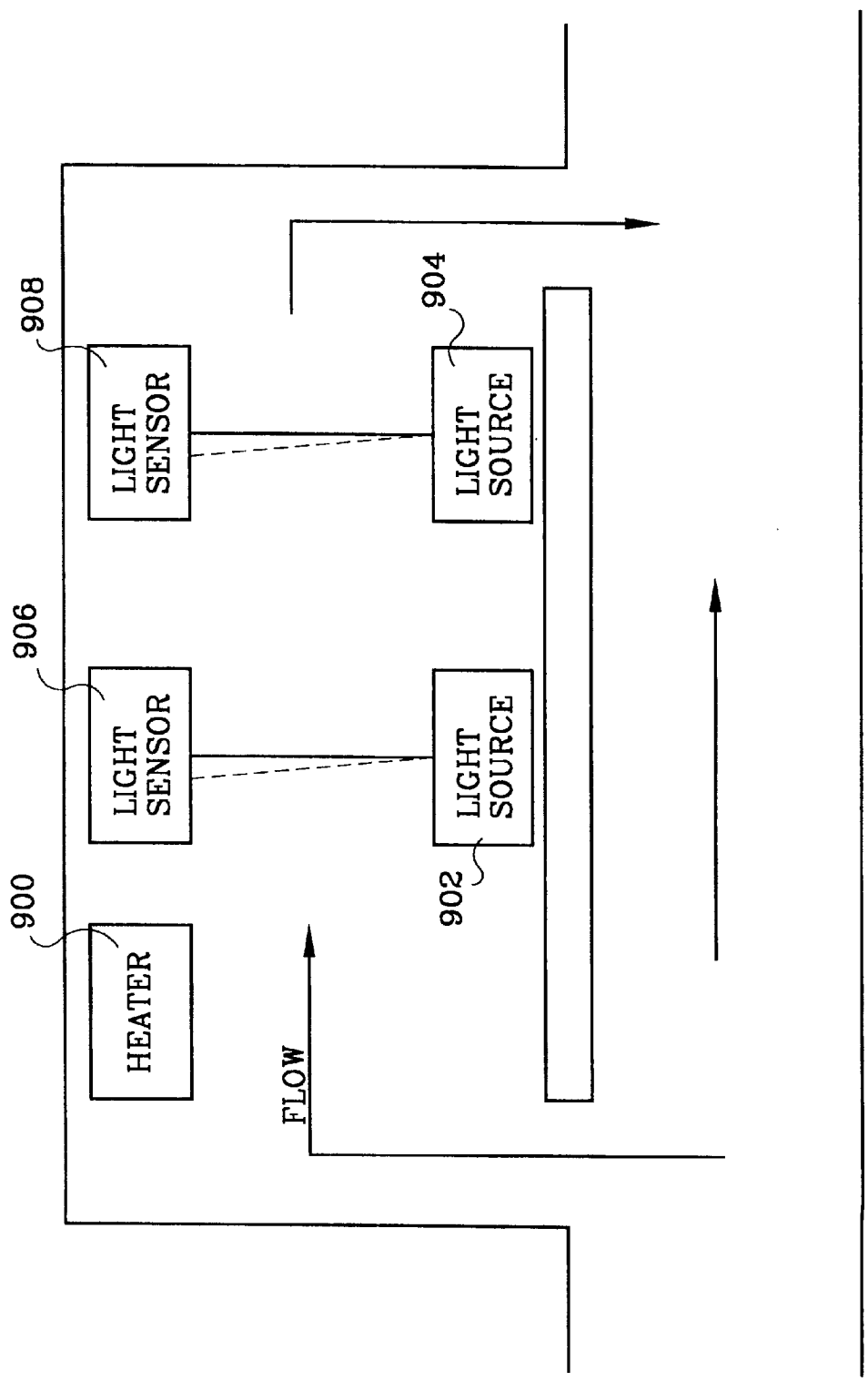
FIG. 19 is a schematic diagram of an illustrative embodiment that uses optical sensor means to measure the transit time of a thermal disturbance from a first location to a second location.
Figure 20:
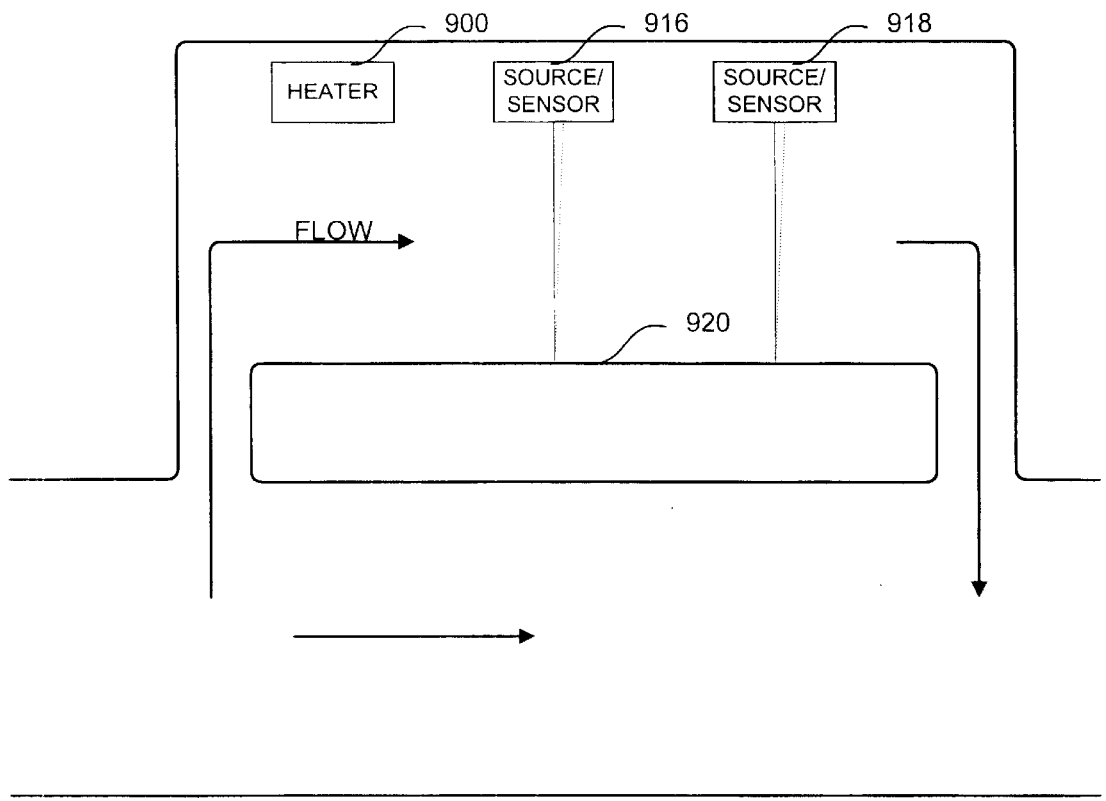
FIG. 20 is a schematic diagram of another illustrative embodiment that uses optical sensor means to measure the transit time of a thermal disturbance from a first location to a second location.

FIG. 19 and FIG. 20 are schematic diagrams of illustrative embodiments that use optical sensor means to measure the transit time required for a thermal disturbance to travel from a first location to a second location. In both embodiments, a heater input signal is provided to a heater element 900 to induce thermal disturbances in the fluid. In FIG. 19, a first light source 902 and a second light source 904 are provided at a first and a second distance from the heater element 900, respectively. A corresponding first light sensor 906 and second light sensor 908 are provided, whereby each light sensor is separated from the corresponding light source so that the fluid passes therebetween. Each of the light source/sensor pairs detects the thermal disturbance by measuring a deflection of the light source due to the modulated index of refraction of the heated fluid. This provides a temperature sensor with little or no thermal mass, thereby minimizing the effects of the sensor time lags inherent in temperature sensitive resistive type sensors.

In FIG. 20, two light source/sensor pairs 916 and 918 are provided adjacent to one another. The light is emitted by each of the light sources, reflected from a reflective surface 920, and returned to the corresponding light sensor. As in FIG. 19, each of the light source/sensor pairs detects the thermal disturbance by measuring a deflection of the light source due to the modulated index of refraction of the heated fluid.

In both embodiments, the light source may any type of light source, but preferably is a LED (Light Emitting Diode) or Vertical Cavity Surface Emitting Laser (VCSEL). The sensor may be any type of light sensor, but preferably a photodiode (PD) or RCPD (Resonant Cavity PhotoDiode).

Having thus described the preferred embodiments of the present invention, those of skill in the art will readily appreciate that the teachings found herein may be applied to yet other embodiments within the scope of the claims hereto attached.

What is claimed is:

1. Apparatus for determining the fluid velocity, V, of a fluid of interest, comprising:

heater means in thermal communication with the fluid of interest, said heater means having a resistance that changes with temperature;

heater energizing means connected to said heater means for energizing said heater means, said heater energizing means providing a transient elevated temperature condition in said heater means;

at least two sensor means in thermal communication with the fluid of interest, each of the at least two sensor means spaced a different distance from said heater means, and each having a resistance that changes with temperature;

time lag means for determining at least two time lag values each corresponding to the delay between said heater means and a corresponding sensor means; and determining means for determining the fluid velocity, v, of the fluid of interest using the at least two time lag values.

2. Apparatus according to claim 1 wherein the at least two time lag values each corresponding to the delay between the transient elevated temperature condition of said heater means and a transient elevated temperature response of a corresponding one of said sensor means.

3. Apparatus according to claim 2 wherein there are two sensor means, and said determining means determines the fluid velocity based on the relation:

$$v=\{(d_1^2/\Delta z_1 - d_2^2/\Delta z_2)(\Delta z_1 - \Delta z_2)\}^{0.5}$$

where,
- $d_1$=the distance between the heater means and a first one of the two sensor means;
- $d_2$=the distance between the heater means and a second one of the two sensor means, where $|d_1| \neq |d_2|$;
- $\Delta z_1$=the time lag value corresponding to the time between the transient elevated temperature condition of said heater means and said transient elevated temperature response of said first sensor means; and
- $\Delta z_2$=the time lag value corresponding to the time between the transient elevated temperature condition of said heater means and said transient elevated temperature response of said second sensor means.

4. Apparatus according to claim 1 wherein each of the sensor means has a corresponding sensor energizing means for energizing the corresponding sensor means with in input power signal, the input power signals having a phase relative to the periodic time-varying input signal of said heater energizing means such that substantially no heat is transferred from the fluid of interest to the at least two sensor means during the transient elevated temperature condition.

5. Apparatus according to claim 1 wherein said heater energizing means provides a periodic time-varying input signal to said heater means to induce the transient elevated temperature condition in said heater means, said apparatus further comprising first output means for providing a first output signal that is proportional to the resistance of said heater means.

6. Apparatus according to claim 5 wherein each of the sensor means has a corresponding sensor energizing means for energizing the corresponding sensor means, each of said sensor energizing means providing a periodic time-varying input signal to the corresponding sensor means that is out of phase relative to the periodic time-varying input signal of said heater energizing means.

7. Apparatus according claim 6 wherein each of the sensor means has a corresponding output means for providing a number of second output signals, each of the second output signals being proportional to the resistance of the corresponding sensor means, and wherein each of the sensor means has a corresponding second time lag means for determining a second time lag value for each of the at least two sensor means, the second time lag values representing the time from the corresponding input power signal provided by the corresponding sensor energizing means to the corresponding second output signal.

8. Apparatus according to claim 7 wherein each of the sensor energizing means comprise a phase shifter for shifting the phase of the periodic time-varying input signal provided by said heater energizing means by an amount which causes each of said second time lag values to be substantially equivalent to a corresponding predetermined value.

9. Apparatus according to claim 8 wherein the predetermined value is equivalent to the second time lag for the corresponding sensor means when measured with the sensor means in a vacuum.

10. Apparatus according to claim 9 wherein the input power signal provided by each of said sensor energizing means has an amplitude that is selected to provide a power-resistance ratio in each of the corresponding sensor means that is substantially identical to the power-resistance ratio in the corresponding sensor means when measured under a vacuum.

11. Apparatus according to claim 1 wherein each of the at least two sensor means comprise a wire.

12. Apparatus according to claim 1 wherein each of the at least two sensor means comprise a film.

13. Apparatus according to claim 1 wherein at least one of the sensor means is positioned upstream from the heater means and at least one of the sensor means is positioned downstream of said heater means.

14. Apparatus according to claim 1 wherein at least two of the sensor means are positioned downstream of said heater means, with a first sensor means positioned closer to the heater means than a second sensor means.

15. Apparatus according to claim 14 wherein the first sensor means is used to measure a first fluid velocity, while the second sensor means is used to measure a second fluid velocity, wherein the second fluid velocity is lower than the first fluid velocity.

16. Apparatus according to claim 1 wherein at least two of the sensor means are positioned upstream of said heater means, with a first sensor means positioned closer to the heater means than a second sensor means.

17. Apparatus according to claim 16 wherein the first sensor means is used to measure a first fluid velocity, while the second sensor means is used to measure a second fluid velocity, wherein the second fluid velocity is lower than the first fluid velocity.

18. Apparatus according to claim 1 wherein said heater energizing means provides an input signal to said heater means to produce the transient elevated temperature condition in said heater means, said heater energizing means providing a first amplitude input signal to said heater means when measuring a first fluid velocity and a second amplitude input signal for measuring a second fluid velocity, wherein the second fluid velocity is lower than the first fluid velocity.

19. Apparatus according to claim 1 wherein said heater energizing means provides a periodic time-varying input signal to said heater means during a measurement period, and subsequently providing a relatively static input signal to said heater means during a wait period.

20. Apparatus according to claim 19 wherein said wait period is longer than said measurement period.

21. Apparatus for determining the fluid velocity, v, of a fluid of interest, comprising:
- heater means in thermal communication with the fluid of interest, said heater means having a resistance that changes with temperature;
- heater energizing means connected to said heater means for energizing said heater means, said heater energizing means providing a heater input signal to said heater means to provide a transient elevated temperature condition in said heater means;
- first sensor means in thermal communication with the fluid of interest, said first sensor means spaced a first distance from said heater means and having a resistance that changes with temperature;
- second sensor means in thermal communication with the fluid of interest, said second sensor means spaced a second distance from said heater means wherein said second distance is different from said first distance, and having a resistance that changes with temperature;
- first sensor energizing means connected to said first sensor means for providing a first sensor input signal to said first sensor means;

second sensor energizing means connected to said second sensor means for providing a second sensor input signal to said second sensor means;

first sensor time lag means for determining a first sensor time lag between the first sensor input signal and the resulting resistance change of said first sensor means;

second sensor time lag means for determining a second sensor time lag between the second sensor input signal and the resulting resistance change of said second sensor means;

said first input power signal being out of phase relative to the input signal provided by said heater energizing means by a sufficient amount to cause said first sensor time lag to be substantially equivalent to a first predetermined time value;

said second input power signal being out of phase relative to the input signal provided by said heater energizing means by a sufficient amount to cause said second sensor time lag to be substantially equivalent to a second predetermined time value;

output time lag means for determining a first output time lag, $\Delta z_1$, between the heater and the first sensor, and a second output time lag, $\Delta z_2$, between the heater and the second sensor; and determining means for determining the fluid velocity, v, of the fluid of interest using the relation:

$$v = \{(d_1^2/\Delta z_1 - d_2^2 \Delta z_2)/(\Delta z_1 - \Delta z_2)\}^{0.5}$$

where, $d_1$=the distance between the heater means and a first sensor means;

$d_2$=the distance between the heater means and the second sensor means, where $|d_1| \neq |d_2|$.

22. Apparatus according to claim 21 wherein the first output time lag, $\Delta z_1$, corresponds to the delay between the heater input signal and the first sensor output signal, and the second output time lag, $\Delta z_2$, corresponds to the delay between the heater input signal and the second sensor output signal.

23. Apparatus according to claim 21 further comprising heater time lag means for determining a heater time lag between the heater input signal and the resulting resistance change of said heater means during the transient elevated temperature condition.

24. Apparatus according to claim 23 wherein the heater time lag is subtracted from the time lag between the heater input signal and the first sensor input signal to provide the first output time lag, $\Delta z_1$, and the heater time lag is subtracted from the lag between the heater input signal and the second sensor input signal to provide the second output time lag, $\Delta z_2$.

25. Apparatus according to claim 21 wherein said first predetermined value is equivalent to the first sensor time lag when measured under a vacuum condition.

26. Apparatus according to claim 25 wherein said second predetermined value is equivalent to the second sensor time lag when measured under a vacuum condition.

27. Apparatus according to claim 26 wherein the first sensor input signal has an amplitude that is selected to provide a power-resistance ratio in said first sensor means that is substantially identical to a power-resistance ratio of said first sensor means when measured under a vacuum condition.

28. Apparatus according to claim 27 wherein the second sensor input signal has an amplitude that is selected to provide a power-resistance ratio in said second sensor means that is substantially identical to a power-resistance ratio of said second sensor means when measured under a vacuum condition.

29. A method for determining the fluid velocity, v, of a fluid of interest using a heater element and at least two spaced sensor elements, the method comprising the steps of:

providing a first one of the sensor elements a first distance from the heater element, and a second one of the sensor elements a second distance from the heater element, wherein the second distance is greater than the first distance;

energizing said heater element to providing a transient elevated temperature condition in said heater element;

determining a first time lag value between the heater element and the first one of the sensor elements;

determining a second time lag value between the heater element and the second one of said sensor elements;

determining the fluid velocity, v, of the fluid of interest using the first and second time lag values.

30. A method according to claim 29 wherein the first time lag value corresponds to the delay between the heater input signal and the first sensor output signal, and the second time lag value corresponds to the delay between the heater input signal and the second sensor output signal.

31. A method according to claim 29 wherein said determining step determines the fluid velocity, v, of the fluid of interest using the relation:

$$v = \{(d_1^2/\Delta z_1 - d_2^2 \Delta z_2)/(\Delta z_1 - \Delta z_2)\}^{0.5}$$

where, $d_1$=the distance between the heater element and a first sensor element;

$d_2$=the distance between the heater element and the second sensor element, where $|d_1| \neq |d_2|$.

$\Delta z_1$=the first time lag value; and $\Delta z_2$=the second time lag value.

32. A method according to claim 29 further comprising the steps of:

energizing said first sensor element with a first sensor input signal having a phase and amplitude such that substantially no heat is transferred from the fluid of interest to the first sensor element during the transient elevated temperature condition; and energizing said second sensor element with a second sensor input signal having a phase and amplitude such that substantially no heat is transferred from the fluid of interest to the second sensor element during the transient elevated temperature condition.

33. A method for measuring the velocity of a fluid of interest using a heater element and a number of spaced sensor elements, the method comprising the steps of:

providing a first one of the sensor elements a first distance from the heater element, and a second one of the sensor elements a second distance from the heater element, wherein the first distance is greater than the second distance;

providing a time-varying heater input signal to said heater element to provide a transient elevated temperature condition in said heater element;

providing a first sensor input signal to said first sensor element;

providing a second sensor input signal to said second sensor element;

determining a first sensor time lag between the first sensor input signal and the resulting resistance change of said first sensor element;

determining a second sensor time lag between the second sensor input signal and the resulting resistance change of said second sensor element;

changing the phase of the first sensor input signal relative to the heater input signal by a sufficient amount to cause said first sensor time lag to be substantially equivalent to a first predetermined time value.

changing the phase of the second sensor input signal relative to the heater input signal by a sufficient amount to cause said second sensor time lag to be substantially equivalent to a second predetermined time value.

determining a first output time lag, $\Delta z_1$, by determining the lag between the heater and the first sensor;

determining a second output time lag, $\Delta z_2$, by determining the lag between the heater and the second sensor;

determining the fluid velocity, v, of the fluid of interest using the relation:

$$v=\{(d_1{}^2/\Delta z_1 - d_2{}^2 \Delta z_2)/(\Delta z_1 - \Delta z_2)\}^{0.5}$$

where, $d_1$=the distance between the heater element and a first sensor element;

$d_2$=the distance between the heater element and the second sensor element, where $|d_1| \neq |d_2|$.

34. A method according to claim 33 further comprising the steps of:

determining a heater lag time between the heater input signal and the resulting resistance change of said heater element;

determining the first output time lag, $\Delta z_1$, by determining the lag between the heater and the first sensor input signal and subtracting the heater lag time; and determining a second output time lag, $\Delta z_2$, by determining the lag between the heater input and the second sensor input signal and subtracting the heater lag time.

35. A method for determining a time lag between a transient elevated temperature condition of a heater element and the transient elevated temperature response of a sensor element through a fluid of interest, the method comprising the steps of:

energizing the heater element to providing a transient elevated temperature condition in said heater element and thus the fluid of interest;

energizing the sensor element with a sensor input signal, wherein said sensor input signal has a phase and an amplitude that causes substantially no heat to be transferred from the fluid of interest to the sensor element during the transient elevated temperature condition; and measuring the time lag between said heater element and the sensor element.

36. Apparatus for determining a time lag between a first location and a second location for a transient elevated temperature condition in a fluid, comprising:

energizing means for energizing a heater element that is thermally coupled to the fluid, thereby providing the transient elevated temperature condition in the fluid;

first optical means for optically detecting the transient elevated temperature condition at a first location;

second optical means for optically detecting the transient elevated temperature condition at a second location, wherein the second location is spaced from the first location; and determining means for determining the time lag between the detected temperature response at the first location and the detected temperature response at the second location.

37. A method for determining a time lag between a first location and a second location for a transient elevated temperature condition in a fluid, comprising the steps of:

energizing a heater element that is thermally coupled to the fluid, thereby providing the transient elevated temperature condition in the fluid;

optically detecting the transient elevated temperature condition at a first location using a first optical device;

optically detecting the transient elevated temperature condition at a second location using a second optical device, wherein the second location is spaced from the first location; and determining the time lag between the detected temperature response at the first location and the detected temperature response at the second location.

* * * * *